(12) United States Patent
Lian et al.

(10) Patent No.: US 11,615,651 B2
(45) Date of Patent: Mar. 28, 2023

(54) REMOTE AUTOMOBILE DIAGNOSTIC METHOD AND APPARATUS, MOBILE TERMINAL, ELECTRONIC DEVICE AND SERVER

(71) Applicant: AUTEL INTELLIGENT TECHNOLOGY CORP., LTD., Guangdong (CN)

(72) Inventors: Yuhua Lian, Guangdong (CN); Jianhua Xiang, Guangdong (CN); Yuexi Yang, Guangdong (CN); Chaochao Yu, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 302 days.

(21) Appl. No.: 16/829,559

(22) Filed: Mar. 25, 2020

(65) Prior Publication Data

US 2020/0226852 A1    Jul. 16, 2020

Related U.S. Application Data

(63) Continuation-in-part of application No. PCT/CN2018/107232, filed on Sep. 25, 2018.

(30) Foreign Application Priority Data

Sep. 25, 2017   (CN) .......................... 201710876993.2

(51) Int. Cl.
   *G07C 5/00* (2006.01)
   *G07C 5/08* (2006.01)
   (Continued)

(52) U.S. Cl.
   CPC ............ *G07C 5/006* (2013.01); *G07C 5/008* (2013.01); *G07C 5/0808* (2013.01); *H04L 43/10* (2013.01); *H04L 67/145* (2013.01)

(58) Field of Classification Search
   None
   See application file for complete search history.

(56) References Cited

U.S. PATENT DOCUMENTS

| | | |
|---|---|---|
| 6,263,268 B1 | 7/2001 | Nathanson |
| 2006/0046725 A1 | 3/2006 | Sonnenrein et al. |
| (Continued) | | |

FOREIGN PATENT DOCUMENTS

| | | | |
|---|---|---|---|
| CN | 103546512 A | * | 1/2014 |
| CN | 103676659 A | | 3/2014 |
| (Continued) | | | |

OTHER PUBLICATIONS

Machine translation of CN 206363155 U (Year: 2017).*

(Continued)

*Primary Examiner* — Anne Marie Antonucci
*Assistant Examiner* — Kyle S Park
(74) *Attorney, Agent, or Firm* — Andrew C. Cheng

(57) ABSTRACT

Embodiments of the present invention relate to the field of automobile diagnosis technologies, and disclose a remote automobile diagnostic method and apparatus, a mobile terminal, an electronic device and a server. A controlled end of remote automobile diagnosis may automatically generate protocol data and send the protocol data to a controlling end; or the controlling end of the remote automobile diagnosis may parse the protocol data, generate an interface associated with a user interface of the controlled end, then receive an interface operation instruction, and generate action data according to the interface operation instruction and send the action data to the controlled end. In this way, a local diagnosis function is added to the controlling end, so that a remote diagnosis function is implemented accordingly, which has favorable scalability.

12 Claims, 12 Drawing Sheets

(51) Int. Cl.
*H04L 29/08* (2006.01)
*H04L 12/26* (2006.01)
*H04L 43/10* (2022.01)
*H04L 67/145* (2022.01)

(56) References Cited

U.S. PATENT DOCUMENTS

| | | | |
|---|---|---|---|
| 2010/0238814 A1 | 9/2010 | Chen et al. | |
| 2013/0304306 A1* | 11/2013 | Selkirk | G07C 5/0808 701/31.4 |
| 2014/0195101 A1 | 7/2014 | Chen et al. | |
| 2015/0121275 A1 | 4/2015 | Marshall et al. | |
| 2016/0180608 A1* | 6/2016 | Chen | G07C 5/0808 701/31.4 |
| 2016/0328890 A1* | 11/2016 | Keane | G07C 5/008 |
| 2017/0267193 A1 | 9/2017 | Wakita | |

FOREIGN PATENT DOCUMENTS

| | | | |
|---|---|---|---|
| CN | 105119947 | A | 12/2015 |
| CN | 105404617 | A | 3/2016 |
| CN | 105843920 | A | 8/2016 |
| CN | 206363155 | U | 7/2017 |
| CN | 107111858 | A | 8/2017 |
| CN | 107608337 | A | 1/2018 |
| DE | 10225784 | A1 | 12/2003 |
| DE | 102011076638 | A1 | 11/2012 |
| DE | 112014005855 | T5 | 12/2016 |
| EP | 2782072 | A2 | 9/2014 |
| JP | 2004299473 | A | 10/2004 |
| KR | 101580568 | B1 * | 12/2015 |

OTHER PUBLICATIONS

Machine translation of KR 101580568 B1 (Year: 2015).*
Machine translation of CN 105119947 A (Year: 2015).*
The Extended European Search Report dated May 31, 2021; Appln. No. 18858440.3.

* cited by examiner

REMOTE AUTOMOBILE DIAGNOSTIC METHOD AND APPARATUS, MOBILE TERMINAL, ELECTRONIC DEVICE AND SERVER

This application is a continuation of International Patent Application No. PCT/CN2018/107232 filed on Sep. 25, 2018, which claims priority to Chinese Patent Application No. 201710876993.2 filed on Sep. 25, 2017, both of which are incorporated by reference herein in their entireties.

BACKGROUND

Technical Field

The present application relates to the field of automobile diagnosis technologies, and in particular, to a remote automobile diagnostic method and apparatus, a mobile terminal, an electronic device and a server.

Related Art

Automobile diagnosis technologies have existed since the birth of automobiles, but with the rapid development of automobile technologies and increasing complexity of high-end automobile configurations, higher professional technical requirements are imposed on automobile maintenance and fault diagnosis technicians. Therefore, automobile diagnostic instruments are more complex and specialized. This not only requires high maintenance funds, but also requires more and more professional qualifications of employees. High-standard 4S shops, chain repair shops, and high-class vehicle clubs cannot be densely popularized, and small repair shops with uneven quality are not enough to provide high-quality and high-level maintenance and repair. An effective way to resolve this dilemma is to carry out remote automobile diagnosis and to remotely resort to technical experts in the industry to diagnose and deal with indefinite fault sites.

At present, most of interfaces and action control in remote automobile diagnosis are based on a predefined set of protocol data. This technology is disadvantageous in the following aspects: If a new function is added, after an interface is developed, protocol data needs to be redefined and a meaning of each field needs to be defined. Both a controlling end and a controlled end need to reprocess received and sent data, reparse the data, and run corresponding logic. As a result, a diagnosis function in remote automobile diagnosis is single because only simple synchronization and control can be performed, and all actions cannot be synchronized from the controlling end to the controlled end, which has poor scalability.

SUMMARY

The primary object of the present invention is to provide a remote automobile diagnostic method and apparatus, a mobile terminal, an electronic device and a server, which have favorable scalability.

Embodiments of the present invention disclose the following technical solutions:

According to a first aspect, an embodiment of the present invention provides a remote automobile diagnostic method applied to a controlled end, including:

sending a connection request to establish a remote connection to a controlling end;

establishing a communication connection to a to-be-diagnosed device;

generating identifiable data according to information of the to-be-diagnosed device;

generating a user interface and protocol data according to the identifiable data, and sending the protocol data to the controlling end; and receiving action data sent by the controlling end according to the protocol data, and executing a diagnosis action corresponding to the action data on the user interface to complete diagnosis of the to-be-diagnosed device.

In some embodiments, the sending a connection request to establish a remote connection to a controlling end includes:

sending a remote diagnosis request to the controlling end;

receiving remote diagnosis response data sent by the controlling end according to the remote diagnosis request; and establishing the remote connection to the controlling end according to the remote diagnosis response data.

In some embodiments, the diagnosis action includes a selection action of a diagnosis parameter and an execution action of a diagnosis event; when the diagnosis action is the selection action of the diagnosis parameter, a corresponding diagnosis parameter or option is selected on the user interface; and when the diagnosis action is the execution action of the diagnosis event, a diagnosis instruction corresponding to the execution action of the diagnosis event is sent to the to-be-diagnosed device.

In some embodiments, the method further includes:

receiving diagnosis result information returned by the to-be-diagnosed device according to the diagnosis instruction; and displaying the diagnosis result information on the user interface.

In some embodiments, the information about the to-be-diagnosed device includes diagnosis request data; and the generating identifiable data according to information about the to-be-diagnosed device includes:

sending a fault code reading instruction to the to-be-diagnosed device according to the diagnosis request data, reading and translating a fault code, and generating the identifiable data.

In some embodiments, the method further includes:

receiving heartbeat data sent by the controlling end; and sending heartbeat response data to the controlling end according to the heartbeat data.

In some embodiments, the method further includes:

presetting a control strategy for the controlling end, the control strategy including: sending data including ID information to the controlling end, and if ID response information sent by the controlling end is received, sending a next piece of data including ID information to the controlling end.

According to a second aspect, an embodiment of the present invention provides a remote automobile diagnostic method applied to a controlling end, including:

establishing a remote connection to a controlled end in response to a connection request;

receiving protocol data sent by the controlling end;

parsing the protocol data, and generating an interface associated with a user interface of the controlled end; and receiving an interface operation instruction, generating action data according to the interface operation instruction, and sending the action data to the controlled end.

In some embodiments, the establishing a remote connection to the controlling end in response to a connection request includes:

receiving a remote diagnosis request sent by the controlled end;

sending remote diagnosis response data to the controlled end according to the remote diagnosis request; and establishing the remote connection to the controlled end according to the remote diagnosis response data.

In some embodiments, the method further includes:

sending heartbeat data to the controlled end; and receiving heartbeat response data sent by the controlled end according to the heartbeat data, to determine an online state of the controlled end.

In some embodiments, the method further includes:

presetting a control strategy for the controlled end, the control strategy including:

sending data including ID information to the controlled end, and if ID response information sent by the controlled end is received, sending a next piece of data including ID information to the controlled end.

According to a third aspect, an embodiment of the present invention provides a remote automobile diagnostic method, including:

respectively establishing connections to a controlled end and a controlling end;

receiving a connection request sent by the controlled end, and forwarding the connection request to the controlling end;

receiving a response connection request sent by the controlling end according to the connection request, and forwarding the response connection request to the controlled end;

receiving protocol data sent by the controlled end, and forwarding the protocol data to the controlling end; and receiving action data sent by the controlling end, and forwarding the action data to the controlled end.

In some embodiments, the method further includes:

receiving heartbeat data sent by the controlling end, and forwarding the heartbeat data to the controlled end; and receiving heartbeat response data sent by the controlled end according to the heartbeat data, and forwarding the heartbeat response data to the controlling end.

In some embodiments, the method further includes:

receiving data that includes ID information and that is sent by the controlled end, and forwarding the data including the ID information to the controlling end; and receiving ID response information sent by the controlling end according to the data including the ID information, and forwarding the ID response information to the controlled end.

According to a fourth aspect, an embodiment of the present invention provides a remote automobile diagnostic apparatus applied to a controlled end, including:

a first connecting unit configured to send a connection request to establish a remote connection to a controlling end;

a second connecting unit configured to establish a communication connection to a to-be-diagnosed device;

an identifiable data generating unit configured to generate identifiable data according to information about the to-be-diagnosed device;

a processing unit configured to generate a user interface and protocol data according to the identifiable data, and send the protocol data to the controlling end; and an executing unit configured to receive action data sent by the controlling end according to the protocol data, and execute a diagnosis action corresponding to the action data on the user interface to complete diagnosis of the to-be-diagnosed device.

In some embodiments, the first connecting unit is specifically configured to: send a remote diagnosis request to the controlling end;

receive remote diagnosis response data sent by the controlling end according to the remote diagnosis request; and establish the remote connection to the controlling end according to the remote diagnosis response data.

In some embodiments, the diagnosis action includes a selection action of a diagnosis parameter and an execution action of a diagnosis event; and the executing unit is further configured to:

when the diagnosis action is the selection action of the diagnosis parameter, select a corresponding diagnosis parameter or option on the user interface; and when the diagnosis action is the execution action of the diagnosis event, send a diagnosis instruction corresponding to the execution action of the diagnosis event to the to-be-diagnosed device.

In some embodiments, the apparatus further includes:

a diagnosis result information receiving unit configured to receive diagnosis result information returned by the to-be-diagnosed device according to the diagnosis instruction; and a diagnosis result information display unit configured to display the diagnosis result information on the user interface.

In some embodiments, the information about the to-be-diagnosed device includes diagnosis request data; and the identifiable data generating unit is specifically configured to:

send a fault code reading instruction to the to-be-diagnosed device according to the diagnosis request data, read and translate a fault code, and generate the identifiable data.

In some embodiments, the apparatus further includes:

a heartbeat data receiving unit configured to receive heartbeat data sent by the controlling end; and a heartbeat response data sending unit configured to send heartbeat response data to the controlling end according to the heartbeat data.

In some embodiments, the apparatus further includes:

a first presetting unit configured to preset a control strategy for the controlling end, the control strategy including:

sending data including ID information to the controlling end, and if ID response information sent by the controlling end is received, sending a next piece of data including ID information to the controlling end.

According to a fifth aspect, an embodiment of the present invention provides a remote automobile diagnostic apparatus applied to a controlling end, including:

a third connecting unit configured to establish a remote connection to a controlled end in response to a connection request;

a protocol data receiving unit configured to receive protocol data sent by the controlling end;

an interface generating unit configured to parse the protocol data, and generate an interface associated with a user interface of the controlled end; and an action data sending unit configured to receive an interface operation instruction, generate action data according to the interface operation instruction, and send the action data to the controlled end.

In some embodiments, the third connecting unit is specifically configured to: receive a remote diagnosis request sent by the controlled end;

send remote diagnosis response data to the controlled end according to the remote diagnosis request; and establish the remote connection to the controlled end according to the remote diagnosis response data.

In some embodiments, the apparatus further includes:

a heartbeat data sending unit configured to send heartbeat data to the controlled end; and a heartbeat response data receiving unit configured to receive heartbeat response data sent by the controlled end according to the heartbeat data, to determine an online state of the controlled end.

In some embodiments, the apparatus further includes:

a second presetting unit configured to preset a control strategy for the controlled end, the control strategy including:

sending data including ID information to the controlled end, and if ID response information sent by the controlled end is received, sending a next piece of data including ID information to the controlled end.

According to a fifth aspect, an embodiment of the present invention provides a remote automobile diagnostic apparatus, including:

a connection establishing unit configured to respectively establish connections to a controlled end and a controlling end;

a connection request forwarding unit configured to receive a connection request sent by the controlled end, and forward the connection request to the controlling end;

a response connection request forwarding unit configured to receive a response connection request sent by the controlling end according to the connection request, and forward the response connection request to the controlled end;

a protocol data forwarding unit configured to receive protocol data sent by the controlled end, and forward the protocol data to the controlling end; and an action data forwarding unit configured to receive action data sent by the controlling end, and forward the action data to the controlled end.

In some embodiments, the apparatus further includes:

a heartbeat data forwarding unit configured to receive heartbeat data sent by the controlling end, and forward the heartbeat data to the controlled end; and a heartbeat response data forwarding unit configured to receive heartbeat response data sent by the controlled end according to the heartbeat data, and forward the heartbeat response data to the controlling end.

In some embodiments, the apparatus further includes:

a forwarding unit configured to receive data that includes ID information and that is sent by the controlled end, and forward the data including the ID information to the controlling end; and a response information forwarding unit configured to receive ID response information sent by the controlling end according to the data including the ID information, and forward the ID response information to the controlled end.

According to a seventh aspect, an embodiment of the present invention provides a mobile terminal, including:

at least one processor; and a memory communicatively connected to the at least one processor, where the memory stores an instruction that may be executed by the at least one processor, the instruction causing the at least one processor to perform the foregoing remote automobile diagnostic method when executed by the at least one processor.

According to an eighth aspect, an embodiment of the present invention provides an electronic device, including:

at least one processor; and a memory communicatively connected to the at least one processor, where the memory stores an instruction that may be executed by the at least one processor, the instruction causing the at least one processor to perform the foregoing remote automobile diagnostic method when executed by the at least one processor.

According to a ninth aspect, an embodiment of the present invention provides a server, including:

at least one processor; and a memory communicatively connected to the at least one processor, where the memory stores an instruction that may be executed by the at least one processor, the instruction causing the at least one processor to perform the foregoing remote automobile diagnostic method when executed by the at least one processor.

According to a tenth aspect, an embodiment of the present invention further provides a non-transitory computer readable storage medium storing computer executable instructions that, when executed by a mobile terminal, cause the mobile terminal to perform the foregoing remote automobile diagnostic method.

According to an eleventh aspect, an embodiment of the present invention further provides a non-transitory computer readable storage medium storing computer executable instructions that, when executed by an electronic device, cause the electronic device to perform the foregoing remote automobile diagnostic method.

According to a twelfth aspect, an embodiment of the present invention further provides a non-transitory computer readable storage medium storing computer executable instructions that, when executed by a server, cause the server to perform the foregoing remote automobile diagnostic method.

According to a thirteenth aspect, an embodiment of the present invention provides a computer program product including a computer program stored on a non-volatile computer readable storage medium, the computer program including program instructions that, when executed by a mobile terminal, cause the mobile terminal to perform the foregoing remote automobile diagnostic method.

According to a fourteenth aspect, an embodiment of the present invention provides a computer program product including a computer program stored on a non-volatile computer readable storage medium, the computer program including program instructions that, when executed by an electronic device, cause the electronic device to perform the foregoing remote automobile diagnostic method.

According to a fifteenth aspect, an embodiment of the present invention provides a computer program product including a computer program stored on a non-volatile computer readable storage medium, the computer program including program instructions that, when executed by a server, cause the server to perform the foregoing remote automobile diagnostic method.

Beneficial effects of the embodiments of the present invention are as follows: In comparison with the prior art, in the embodiments of the present invention, the controlled end may automatically generate the protocol data and send the protocol data to the controlling end; or the controlling end may parse the protocol data, generate the interface associated with the user interface of the controlled end, then receive the interface operation instruction, and generate the action data according to the interface operation instruction and send the action data to the controlled end. In this way, a local diagnosis function is added to the controlling end, so that a remote diagnosis function is implemented accordingly, which has favorable scalability.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

In order to make the objectives, technical solutions, and advantages of the present invention more comprehensible, the technical solutions according to embodiments of the present invention are clearly and completely described in the following with reference to the accompanying drawings. Apparently, the embodiments in the following description are merely some rather than all of the embodiments of the present invention. All other embodiments obtained by a person of ordinary skill in the art based on the embodiments of the present invention without creative efforts shall fall within the protection scope of the present invention.

In addition, the technical features provided in the embodiments of the present invention to be described below may be combined with each other as long as no conflict occurs.

Embodiments of the present invention provide a remote automobile diagnostic method and apparatus, a mobile terminal and an electronic device. According to the remote automobile diagnostic method and apparatus, the mobile terminal and the electronic device, a local diagnosis function can be added to a controlling end, so that a remote diagnosis function is implemented accordingly, which has favorable scalability. Examples are taken below to illustrate an application environment of the foregoing method.

Figure 1:
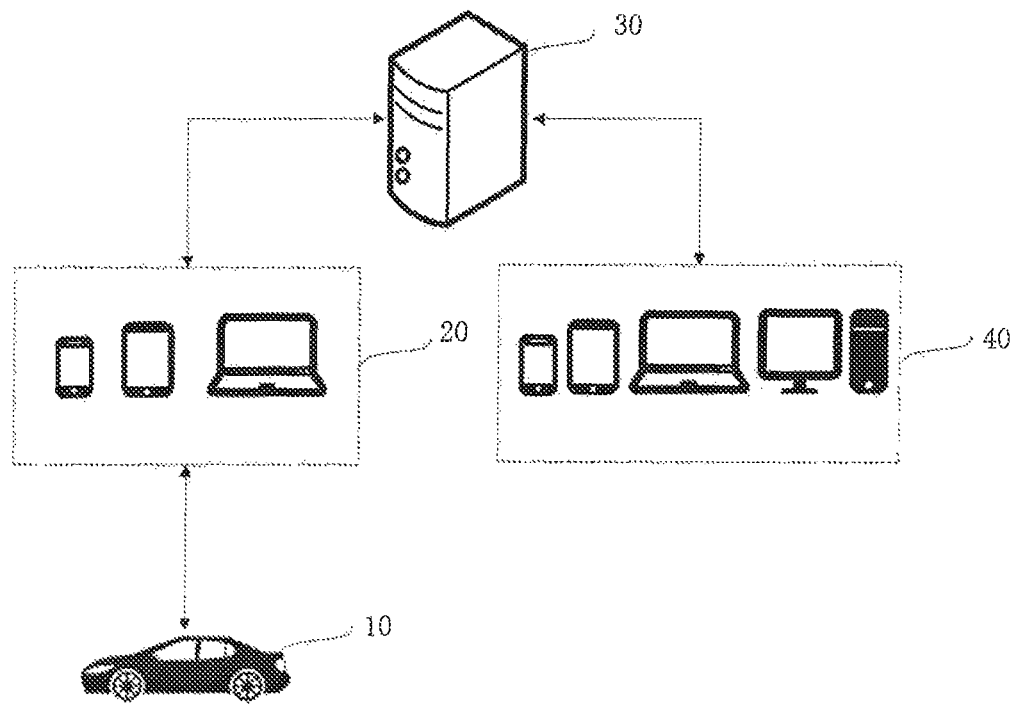
FIG. 1 is a schematic diagram of an application environment of a remote automobile diagnostic method according to an embodiment of the present invention.

FIG. 1 is a schematic diagram of an application environment of a remote automobile diagnostic method according to an embodiment of the present invention. An application scenario includes a to-be-diagnosed device 10, a controlled end 20, a remote diagnosis server 30 and a controlling end 40. The controlled end 20 is a device that is connected to the to-be-diagnosed device 10 (such as an automobile) and that is controlled by the controlling end 40 in a remote diagnosis process. The controlling end 40 is a device that implements control and directs a specific operation in the remote diagnosis process. The to-be-diagnosed device 10 is connected to the controlled end 20, the controlled end 20, the server 30 and the controlling end 40 are connected through a network, and the controlled end 20 and the controlling end 40 are remotely connected. The controlled end 20 may read and parse fault information in the to-be-diagnosed device 10, and send the parsed information to the controlling end 40 through the remote diagnosis server 30. The controlling end 40 generates diagnosis action information and sends the diagnosis action information to the controlled end 20 through the remote diagnosis server 30. The controlled end 20 executes a diagnosis action corresponding to the diagnosis action information to diagnose the to-be-diagnosed device 10. In some embodiments, the remote diagnosis server 30 is mainly configured to forward information and store data.

The controlled end 20 includes device application software, a diagnostic protocol package and a lower computer module. The lower computer module is an intermediate device connected to the to-be-diagnosed device 10 such as a vehicle communication interface device (VCI device), and is configured to read data from the to-be-diagnosed device 10 and diagnose the to-be-diagnosed device 10. The diagnostic protocol package is a set of control commands for parsing the read fault information, generating data that can be identified by the device application software, and generating protocol data according to the identifiable data. The device application software of the controlled end displays a diagnosis data interface, sends data to the controlling end 40, and responds to an action of the controlling end 40.

Figure 2:
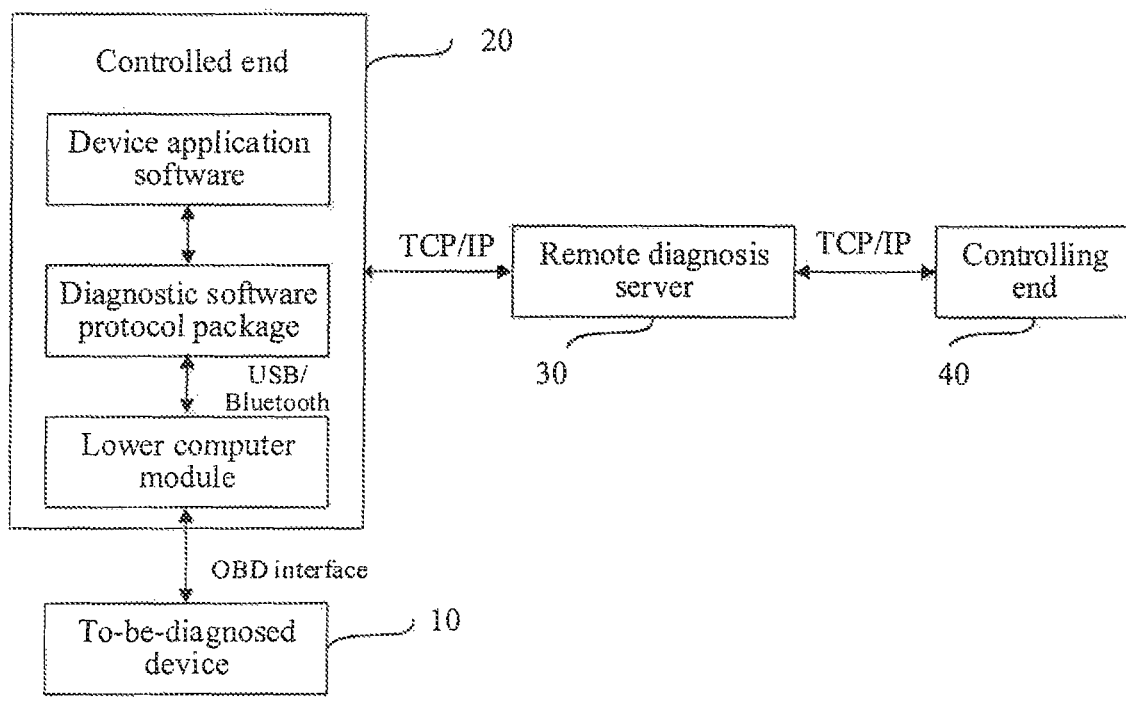
FIG. 2 is a schematic diagram of an implementation principle of application of a remote automobile diagnostic method according to an embodiment of the present invention.

FIG. 2 is a schematic diagram of an implementation principle of application of a remote automobile diagnostic method according to an embodiment of the present invention. The implementation principle mainly includes the following steps:

1. The controlled end 20 sends a connection request, and the controlling end 40 establishes a remote connection between the controlled end 20 and the controlling end 40 in response to the connection request. A process of establishing the remote connection may specifically include: The controlled end 20 sends a remote diagnosis request, the remote diagnosis request being sent to the controlling end 40 through forwarding of the remote diagnosis server 30; and the controlling end 40 sends remote diagnosis response data according to the remote diagnosis request, the remote diagnosis response data being sent to the controlled end 20 through forwarding of the remote diagnosis server 30. Therefore, the controlled end 20 and the controlling end 40 are remotely connected.

2. The controlled end 20 reads a fault code in the to-be-diagnosed device 10, and generates identifiable data. Specifically, the lower computer module of the controlled end 20 receives diagnosis request data sent by the to-be-diagnosed device 10. The lower computer module sends a fault code reading instruction to the to-be-diagnosed device 10 according to the diagnosis request data, reads the fault code, and sends the read fault code to a diagnostic software protocol package of the controlled end 20. The diagnostic software protocol package parses the fault code, and generates the identifiable data. The fault code is a code defined for each fault in an electronic control unit (ECU) of an automobile. The identifiable data is data that can be identified by upper-layer software (such as the device application software). The sending of the fault code reading instruction and the reading of the fault code can be implemented through communication between the lower computer module and an on-board diagnostic (OBD) system interface. In addition, the lower computer module and the diagnostic software protocol package are connected and communicated through wired communication or wireless communication, such as a USB connection or a Bluetooth connection.

3. The controlled end 20 generates a user interface and protocol data according to the identifiable data, and forwards the protocol data to the controlling end 40 through the remote diagnosis server 30. The protocol data may be a JavaScript object notation (JSON) protocol data. JSON is a data format based on Internet transmission. JSON is a lightweight data interchange format. JSON is based on a subset of ECMAScript (a JS specification stipulated by w3c) and uses a text format that is completely independent of a programming language to store and represent data. Because JSON has a concise and clear hierarchy, JSON becomes an ideal data exchange language. JSON is easy for people to read and write, and is also easy for machines to parse and generate, thereby effectively improving network transmission efficiency. A specific process of generating the user interface and the JSON protocol data is: the diagnostic protocol package generates the user interface according to the identifiable data, which is convenient and intuitive for a user to display; and automatically generates a JSON software framework to generate the JSON protocol data. In addition, the controlled end 20 sends the JSON protocol data to the remote diagnosis server 30 by establishing a TCP/IP connection to the remote diagnosis server 30.

4. The remote diagnosis server 30 receives the JSON protocol data sent by the controlled end 20, and sends the JSON protocol data to the controlling end 40. For a data backup, the remote diagnosis server 30 may store the JSON protocol data. The remote diagnosis server 30 may be developed for C++, and has a fast response, a strong service processing capability and functions such as data storage and forwarding and device management. The remote diagnosis server 30 sends the JSON protocol data to the controlling end 40 by establishing a TCP/IP connection to the controlling end 40.

5. The controlling end 40 receives and parses the protocol data, and generates an interface associated with a user interface of the controlled end. Specifically, after receiving the JSON protocol data, the controlling end 40 automatically parses the JSON protocol data through the JSON software framework, and generates, through a reflection technology, a synchronization interface associated with the user interface of the controlled end. The reflection technology is a technology in a programming language in which corresponding logic can be run by knowing file and function names. Therefore, the synchronization interface can be produced through the reflection technology.

6. The controlling end 40 receives an interface operation instruction, generates action data according to the interface operation instruction, and sends the action data to the controlled end 20. In particular, when a user operates an interface of the controlling end 40, the controlling end 40 receives the interface operation instruction, generates JSON action data according to the interface operation instruction, and sends the generated JSON action data to the controlled end through the remote diagnosis server 30.

7. The controlled end 20 receives the action data, sends a diagnosis command to the to-be-diagnosed device 10 according to the action data, and executes a diagnosis action corresponding to the action data on the user interface of the controlled end 20, to diagnose the to-be-diagnosed device 10. Specifically, after receiving the JSON action data, the controlled end 20 executes a corresponding file, a corresponding function, and executes the corresponding diagnosis action according to the diagnosis command to diagnose the to-be-diagnosed device 10. In this way, a synchronous operation of the diagnosis action of the controlling end 40 on the controlled end 20 is implemented. The diagnosis action includes a selection action of a diagnosis parameter and an execution action of a diagnosis event; when the diagnosis action is the selection action of the diagnosis parameter, a corresponding diagnosis parameter or option is selected on the user interface; and when the diagnosis action is the execution action of the diagnosis event, a diagnosis instruction corresponding to the execution action of the diagnosis event is sent to the to-be-diagnosed device.

8. The controlled end 20 receives diagnosis result information returned by the to-be-diagnosed device 10 according to the diagnosis instruction, and displays the diagnosis result information on the user interface, to intuitively display a diagnosis result.

In this embodiment of the present invention, after receiving the JSON protocol data, the controlling end 40 automatically parses the JSON protocol data through the JSON software framework, and generates the corresponding synchronization interface through the reflection technology. When receiving the interface operation instruction, the controlling end 40 generates the JSON action data according to the interface operation instruction, and sends the generated JSON action data to the controlled end 20 through the remote diagnosis server 30. After receiving the JSON action data, the controlled end 20 executes the corresponding file and the corresponding function through the reflection technology. Therefore, interface synchronization and action synchronization can be stably implemented. In addition, the reflection technology is used to improve scalability. The following provides detailed description through a flowchart of command synchronization.

Figure 3:
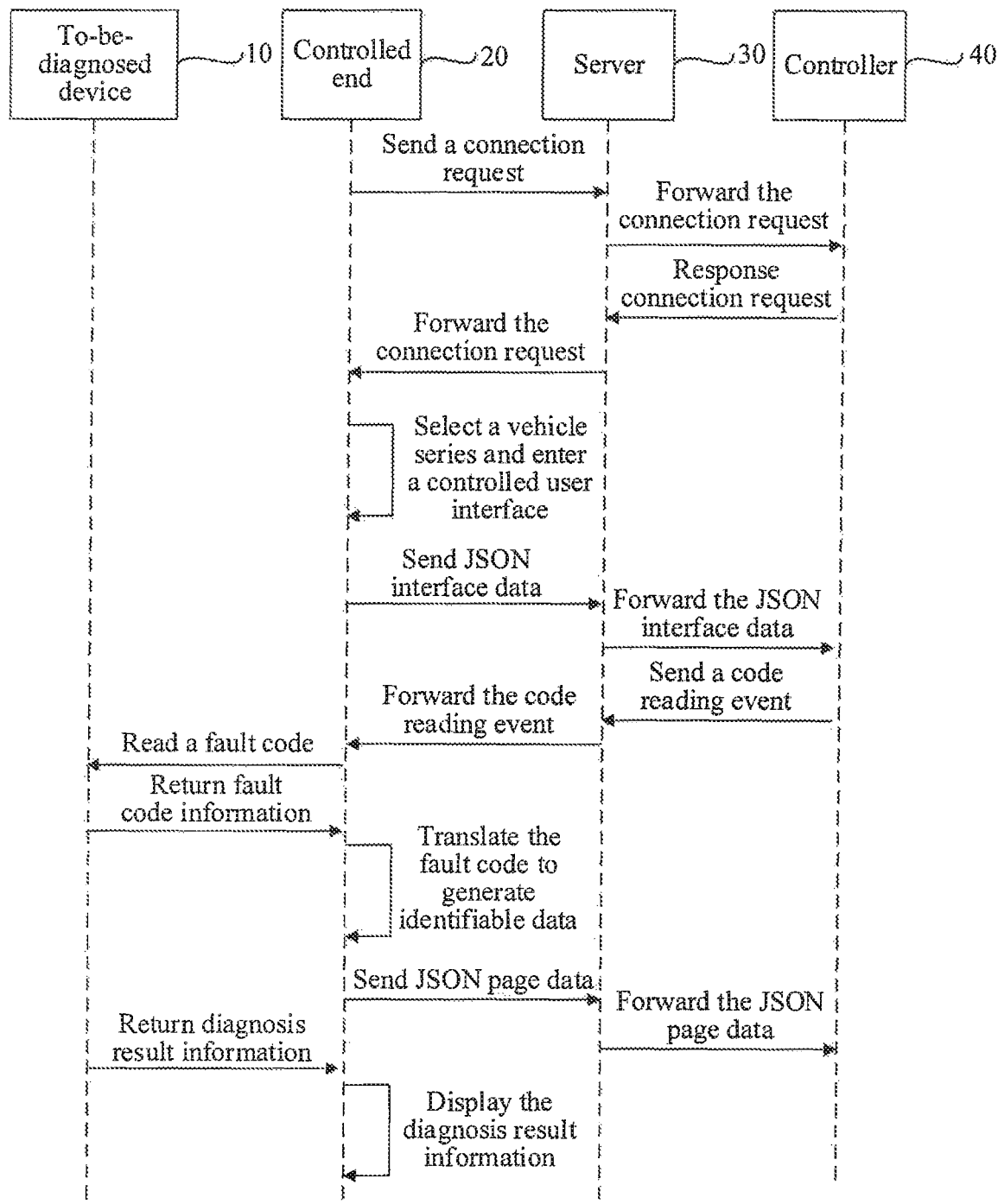
FIG. 3 is a flowchart of synchronization of a remote diagnosis command according to an embodiment of the present invention.

FIG. 3 is a flowchart of synchronization of a remote diagnosis command. A synchronization procedure of the remote diagnosis command mainly includes: the controlled end 20 sends a connection request, the connection request being forwarded by the remote diagnosis server 30. The controlling end 40 sends a response connection request after receiving the connection request, the response connection request being forwarded by the remote diagnosis server 30. The controlled end 20 receives the response connection request from the controlling end 40 to establish a remote connection to the controlling end. After the remote connection is established, the controlled end 20 enters a vehicle selection interface of the user interface such that a user can select a currently diagnosed vehicle series, and enter a controlled user interface after determining the vehicle series. JSON interface data is forwarded to the controlling end 40 through the remote diagnosis server 30. In this case, a control right is completely transferred to the controlling end 40. The controlling end 40 generates a same interface as the controlled end 20. If the controlling end 40 clicks to read the fault code, the controlling end sends a click event to the controlled end 20 through forwarding of the remote diagnosis server 30. The controlled end 20 executes corresponding logic and reads the fault code from the to-be-diagnosed device 10 through the lower computer module. The fault code is parsed through the diagnostic protocol package. The device application software of the controlled end 20 then generates JSON page data, which is sent to the controlling end 40 through forwarding of the remote diagnosis server 30. In this way, the controlling end 40 views a detailed fault code list, and provides a maintenance suggestion and/or a next diagnosis function for the controlled end 20.

It should be noted that, in this embodiment of the present invention, the to-be-diagnosed device 10 may be an automobile such as a passenger vehicle or a commercial vehicle. The controlled end 20 includes a diagnosis host and a lower computer module. The lower computer may be an independent apparatus or integrated with the diagnosis host. The diagnosis host may be a variety of mobile terminals, such as an automobile diagnostic instrument, a laptop computer, a tablet computer or a smart phone. The lower computer may be a vehicle communication interface device such as J2534 ECU, an OBD connector or a vehicle Bluetooth connection box. The remote diagnosis server 30 may be a traditional server, a cloud server or the like. The controlling end 40 may be an electronic device such as an automobile diagnostic instrument, a desktop computer, a laptop computer, a tablet computer or a smart phone.

It should be further noted that, in some other embodiments, the diagnostic software protocol package may be on the controlling end 40, and the controlled end 20 may have no diagnostic protocol package. The fault code read by the controlled end 20 from the to-be-diagnosed device 10 is directly transmitted to the controlling end 40, and the controlling end 40 processes the fault code.

In this embodiment of the present invention, the controlled end 20 may automatically generate the protocol data and send the protocol data to the controlling end 40; and the controlling end 40 may parse the protocol data, generate the interface associated with the user interface of the controlled end 20, then receive the interface operation instruction, and generate the action data according to the interface operation instruction and send the action data to the controlled end 20. In this way, a local diagnosis function is added to the controlling end 40, and a remote diagnosis function is implemented accordingly, which can implement interface synchronization and action synchronization and has favorable scalability.

Figure 4:
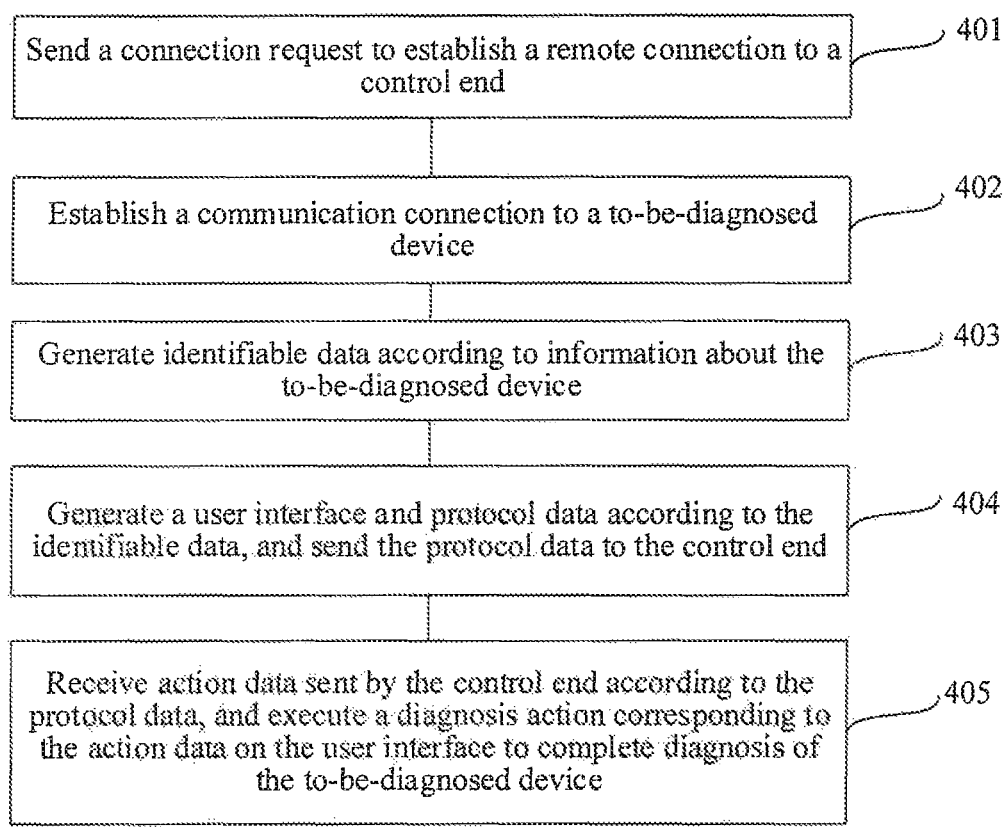
FIG. 4 is a schematic flowchart of a remote automobile diagnostic method according to an embodiment of the present invention.

FIG. 4 is a schematic flowchart of a remote automobile diagnostic method according to an embodiment of the present invention. The remote automobile diagnostic method provided in this embodiment of the present invention is applied to a controlled end and can be performed by the controlled end 20 in FIG. 1, for example, an automobile diagnostic instrument, a laptop computer, a tablet computer or a smart phone.

Referring to FIG. 4, the method includes the following steps.

401: A connection request is sent to establish a remote connection to a controlling end.

In this embodiment of the present invention, the controlled end sends the connection request to establish the remote connection to the controlling end. The remote connection means that the controlled end and the controlling end are connected through a network such as the Internet or a local area network. By establishing the remote connection, the controlling end may control the controlled end and the controlling end may operate the controlled end in real time.

402: A communication connection to a to-be-diagnosed device is established.

In this embodiment of the present invention, the controlled end may establish the communication connection to the to-be-diagnosed device through an OBD interface.

403: Identifiable data is generated according to information about the to-be-diagnosed device.

In this embodiment of the present invention, the controlled end generates the identifiable data according to the information about the to-be-diagnosed device. The identifiable data is data that can be identified by upper-layer software. From a software development perspective, software may include upper-layer software and lower-layer software. The upper-layer software (an interface, an application, or the like) mainly provides human-computer interaction and technical support, and the lower-layer software (embedded software, a driver, or the like) mainly provides an execution function and a feedback function. The to-be-diagnosed device may be an automobile or the like. The information about the to-be-diagnosed device includes a vehicle model, a vehicle series, a vehicle identification number (VIN) and the like, and further includes diagnosis request data and diagnosis result data sent by the to-be-diagnosed device. The information about the to-be-diagnosed device may be sent by the to-be-diagnosed device to the controlled end, or may be information manually entered by a user of the controlled end, such as a vehicle series and a vehicle model.

404: A user interface and protocol data are generated according to the identifiable data, and the protocol data is sent to the controlling end.

In this embodiment of the present invention, the controlled end generates the user interface and the protocol data according to the identifiable data, and sends the protocol data to the controlling end. A protocol is an abbreviation of a network protocol. The network protocol is a set of conventions that two communication computers need to comply with, for example, how to establish a connection and how to identify each other. The computers can communicate with each other by complying with this convention. To enable data to reach a destination end from a source end on a network, participants in network communication need to comply with same rules. This set of rules is referred to as a protocol, and is ultimately manifested as a format of a data packet transmitted on the network, that is, protocol data. The protocol data may be JSON protocol data. JSON is a lightweight data format for Internet transmission, and is easy for people to read and write and is also easy for machines to parse and generate, thereby improving network transmission efficiency. A specific process of generating the user interface and the JSON protocol data is: the controlled end generates the user interface according to the identifiable data, which is convenient and intuitive for a user to display; and automatically generates a JSON software framework to generate the JSON protocol data. The JSON protocol data is sent to the controlling end through forwarding of a remote diagnosis server.

405: Action data sent by the controlling end according to the protocol data is received, and a diagnosis action corresponding to the action data is executed on the user interface to complete diagnosis of the to-be-diagnosed device.

In this embodiment of the present invention, the controlled end receives the action data, where the action data is data generated according to an action, and the action data may be JSON action data; and executes a corresponding file and a corresponding function through a reflection technology, and executes a corresponding diagnosis action according to a diagnosis command to diagnose the to-be-diagnosed device. The reflection technology is a technology in a programming language in which corresponding logic can be run by knowing file and function names. Through the reflection technology, interfaces and actions of the controlled end and the controlling end can be synchronized. For example, the controlling end executes a "Check" action, the controlled end also executes a "Check" action, the controlling end clicks "Read a fault code", and the controlled end also clicks "Read a fault code" and sends a "Read a fault code" command to the to-be-diagnosed device.

It should be noted that, for technical details not described in detail in steps 401 to 405 in this embodiment of the present invention, refer to the specific description of the foregoing embodiment.

The remote automobile diagnostic method provided in this embodiment of the present invention is applied to the controlled end. The controlled end may automatically generate the protocol data and send the protocol data to the controlling end. If a new function is added, after the interface is developed, there is no need to redefine the protocol data or define a meaning of each field. The controlled end can implement interface synchronization and action synchronization without reprocessing sent and received data and reparsing the data, which has favorable scalability.

Figure 5:
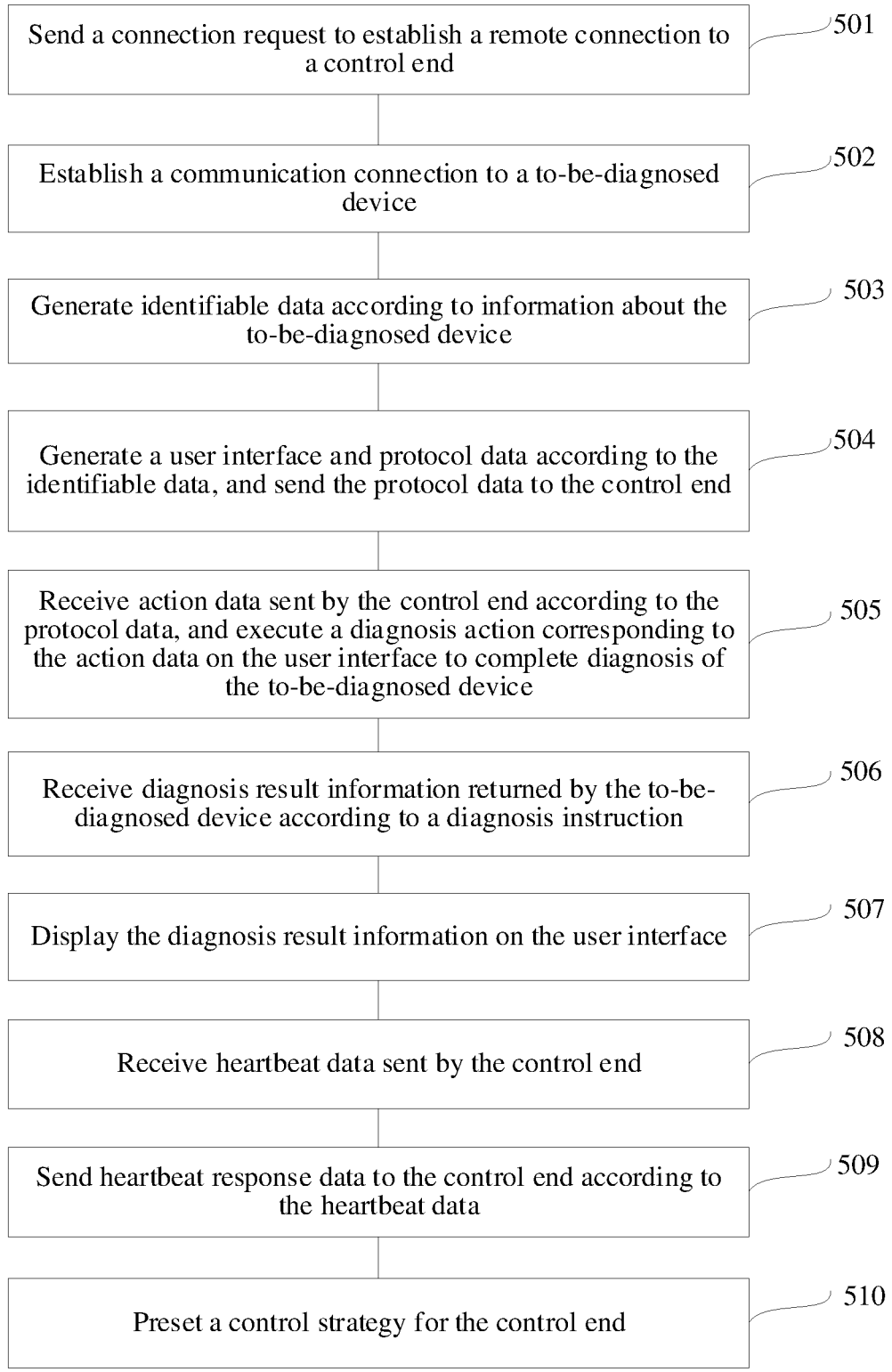
FIG. 5 is a schematic flowchart of a remote automobile diagnostic method according to another embodiment of the present invention.

FIG. 5 is a schematic flowchart of a remote automobile diagnostic method according to another embodiment of the present invention. The remote automobile diagnostic method provided in the another embodiment of the present invention is applied to a controlled end and can be performed by the controlled end 20 in FIG. 1, for example, an automobile diagnostic instrument, a laptop computer, a tablet computer or a smart phone.

Referring to FIG. 5, the method includes the following steps.

501: A connection request is sent to establish a remote connection to a controlling end.

In this embodiment of the present invention, the controlled end sends the connection request to establish the remote connection to the controlling end. In particular, a remote diagnosis request is sent to the controlling end; remote diagnosis response data sent by the controlling end according to the remote diagnosis request is received; and the remote connection to the controlling end is established according to the remote diagnosis response data.

502: A communication connection to a to-be-diagnosed device is established.

503: Identifiable data is generated according to information about the to-be-diagnosed device.

In this embodiment of the present invention, the controlled end generates the identifiable data according to the information about the to-be-diagnosed device. The information about the to-be-diagnosed device includes diagnosis request data. In particular, a fault code reading instruction is sent to the to-be-diagnosed device according to the diagnosis request data, a fault code is read and translated, and the identifiable data is generated.

504: A user interface and protocol data are generated according to the identifiable data, and the protocol data is sent to the controlling end.

In this embodiment of the present invention, the controlled end generates the user interface and the protocol data according to the identifiable data, and sends the protocol data to the controlling end. The protocol data may be JSON protocol data. A specific process of generating the user interface and the JSON protocol data is: the controlled end generates the user interface according to the identifiable data, which is convenient and intuitive for a user to display; and automatically generates a JSON software framework to generate the JSON protocol data. The JSON protocol data is sent to the controlling end through forwarding of a remote diagnosis server.

505: Action data sent by the controlling end according to the protocol data is received, and a diagnosis action corresponding to the action data is executed on the user interface to complete diagnosis of the to-be-diagnosed device.

In this embodiment of the present invention, the controlled end receives the action data, where the action data is data generated according to an action, and the action data may be JSON action data; and executes a corresponding file and a corresponding function through a reflection technology, and executes a corresponding diagnosis action according to a diagnosis command to diagnose the to-be-diagnosed device. The reflection technology is a technology in a programming language in which corresponding logic can be run by knowing file and function names. Through the reflection technology, interfaces and actions of the controlled end and the controlling end can be synchronized. The diagnosis action includes a selection action of a diagnosis parameter and an execution action of a diagnosis event; when the diagnosis action is the selection action of the diagnosis parameter, a corresponding diagnosis parameter or option is selected on the user interface; and when the diagnosis action is the execution action of the diagnosis event, a diagnosis instruction corresponding to the execution action of the diagnosis event is sent to the to-be-diagnosed device.

In this embodiment of the present invention, the remote automobile diagnostic method further includes the following steps.

506: Diagnosis result information returned by the to-be-diagnosed device according to the diagnosis instruction is received.

507: The diagnosis result information is displayed on the user interface.

In this embodiment of the present invention, the diagnosis result information is displayed on a user interface of the controlled end, so that a diagnosis result is displayed intuitively.

508: Heartbeat data sent by the controlling end is received.

In this embodiment of the present invention, the controlled end receives heartbeat data sent by the controlling end. The heartbeat data is a small data packet that is sent to another connected party at intervals, and it is determined, based on a response from the other party, whether a communication link between the two connected parties is disconnected.

509: Heartbeat response data is sent to the controlling end according to the heartbeat data.

In this embodiment of the present invention, the controlled end sends the heartbeat response data to the controlling end according to the heartbeat data.

The heartbeat data is received and the heartbeat response data is sent to monitor at any time whether the controlled end and the controlling end are online. The following provides detailed description through a schematic timing diagram of a two-way heartbeat.

Figure 6:
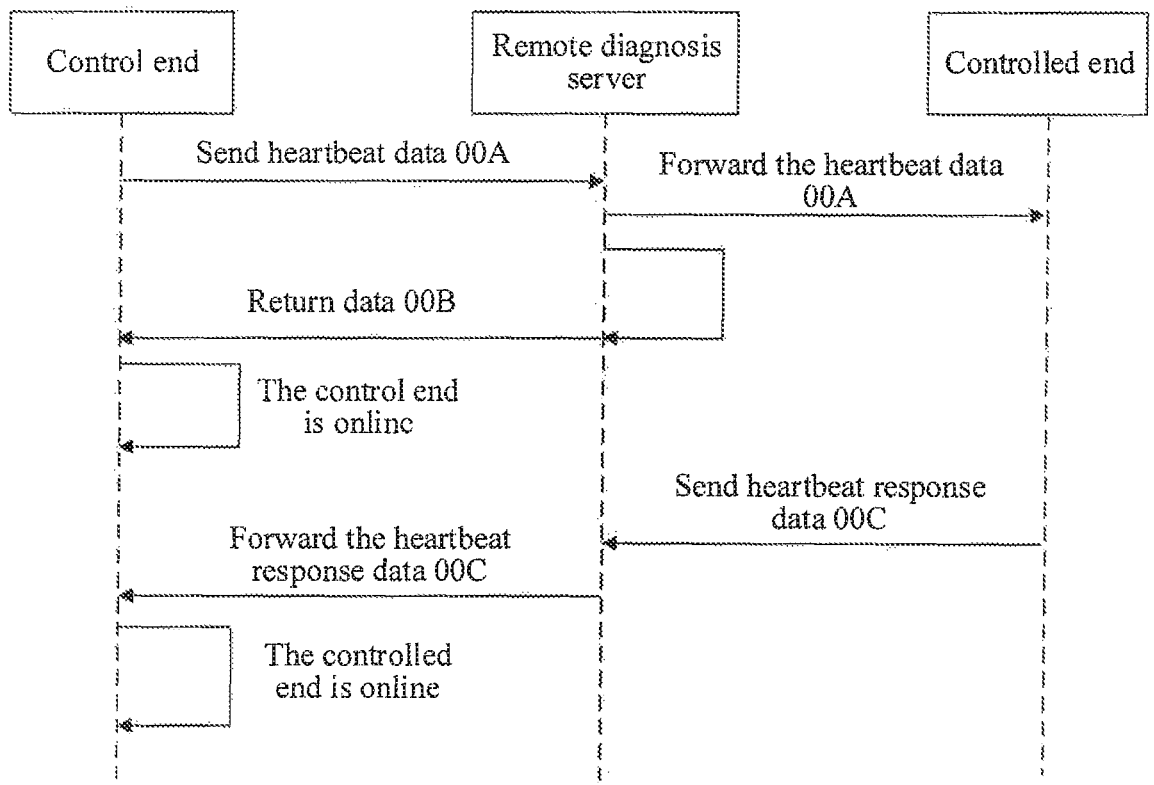
FIG. 6 is a schematic timing diagram of a two-way heartbeat according to an embodiment of the present invention.

FIG. 6 is a schematic timing diagram of a two-way heartbeat. The controlling end sends heartbeat data 00A to the remote diagnosis server. If the remote diagnosis server returns data 00B, it indicates that the controlling end is online. The remote diagnosis server forwards the heartbeat data 00A to the controlled end, and the controlled end returns heartbeat response data 00C to the controlling end. If the controlling end receives the heartbeat response data 00C, it indicates that the controlled end is also online. In this way, whether the controlled end and the controlling end are online can be monitored at any time. If the controlled end and the controlling end are not online, a reminder can be provided in time to reconnect and continue remote diagnosis.

It should be noted that, in some other embodiments, the data sent and received by the controlled end and the controlling end in a two-way heartbeat may be exchanged. That is, the controlled end sends heartbeat data 00A to the remote diagnosis server. If the remote diagnosis server returns data 00B, it indicates that the controlled end is online. The remote diagnosis server forwards the heartbeat data 00A to the controlling end, and the controlling end returns heartbeat response data 00C to the controlled end. If the controlled end receives the heartbeat response data 00C, it indicates that the controlling end is also online.

510: A control strategy is preset for the controlling end.

In this embodiment of the present invention, the controlled end may preset the control strategy for the controlling end. The control strategy includes: sending data including ID information to the controlling end, and if ID response information sent by the controlling end is received, sending a next piece of data including ID information to the controlling end. The ID information may be randomly generated. Through the control strategy, data can be sent to controlling end accurately and orderly without being lost. The following provides detailed description through a schematic timing diagram of sending a data response by a controlled end.

Figure 7:
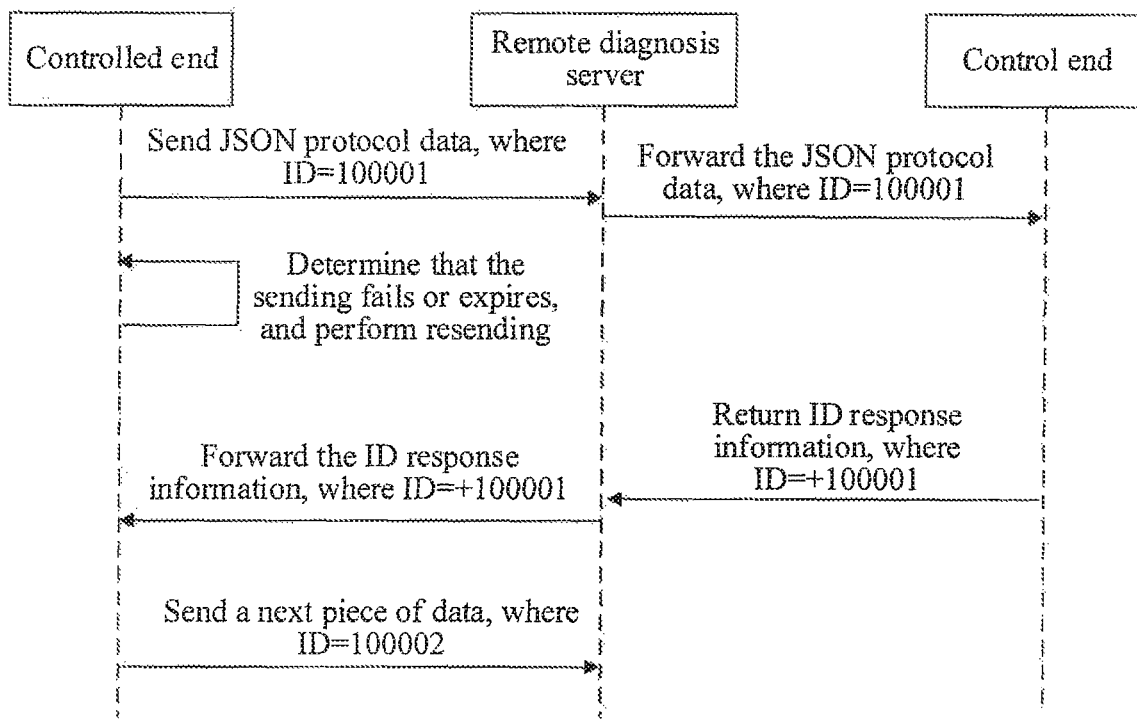
FIG. 7 is a schematic timing diagram of sending a data response by a controlled end according to an embodiment of the present invention.

FIG. 7 is a schematic timing diagram of sending a data response by a controlled end. The controlled end sends JSON protocol data, where the JSON protocol data includes ID information such as ID=100001, and is forwarded to the controlling end via a server. If the controlled end receives ID response information such as ID=+100001 that is sent by the controlling end and that is forwarded by a remote diagnosis server, a next piece of data including ID information such as ID=100002 is sent. If the controlled end does not receive the ID response information, it indicates that sending of this piece of data fails or expires, and this piece of data is repeatedly sent until the ID response information is received.

It may be understood that, in some other embodiments, steps 506 to 510 may not be mandatory steps in different embodiments. In addition, according to the description of this embodiment of the present invention, a person of ordinary skill in the art may understand that, steps 501 to 510 may have different execution orders in different embodiments.

It should be further noted that, for technical details not described in detail in steps 501 to 510 in this embodiment of the present invention, refer to the specific description of the foregoing embodiment.

The remote automobile diagnostic method provided in this embodiment of the present invention is applied to the controlled end. The controlled end may automatically generate the protocol data and send the protocol data to the controlling end. If a new function is added, after the interface is developed, there is no need to redefine the protocol data or define a meaning of each field. The controlled end can implement interface synchronization and action synchronization without reprocessing sent and received data and reparsing the data, which has favorable scalability. In addition, the heartbeat data is received and the heartbeat response data is sent, and each piece of sent data carries an ID. In this way, an online state of the controlled end or the controlling end can be monitored at any time, to ensure that data is accurately sent to the controlling end without being lost, so that safety of automobile diagnosis is ensured and a safety accident during the automobile diagnosis is avoided.

Figure 8:
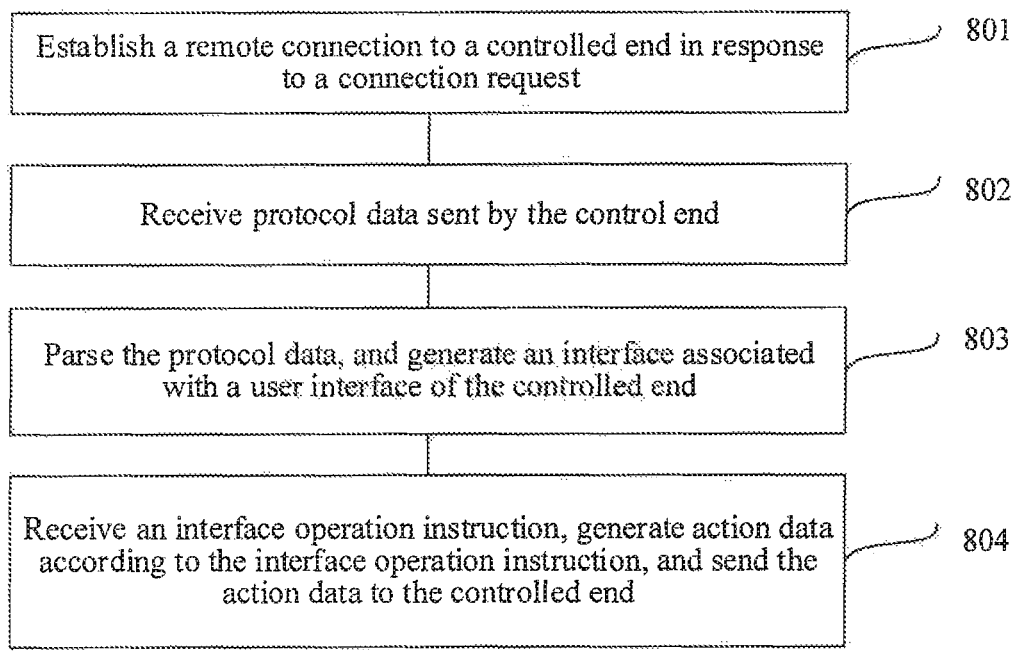
FIG. 8 is a schematic flowchart of a remote automobile diagnostic method according to another embodiment of the present invention.

FIG. 8 is a schematic flowchart of a remote automobile diagnostic method according to another embodiment of the present invention. The remote automobile diagnostic method provided in the another embodiment of the present invention is applied to a controlling end and can be performed by the controlling end 40 in FIG. 1, for example, an automobile diagnostic instrument, a desktop computer, a laptop computer, a tablet computer or a smart phone.

Referring to FIG. 8, the method includes the following steps.

801: A remote connection to a controlled end is established in response to a connection request.

In this embodiment of the present invention, the controlling end establishes the remote connection to the controlled end in response to the connection request. The controlled end and the controlling end are connected through a network. By establishing the remote connection, the controlling end may control the controlled end and the controlling end may operate the controlled end in real time.

802: Protocol data sent by the controlling end is received.

In this embodiment of the present invention, the controlling end receives the protocol data sent by the controlling end. The protocol data may be JSON protocol data. JSON is a lightweight data format for Internet transmission, and is easy for people to read and write and is also easy for machines to parse and generate, thereby improving network transmission efficiency.

803: The protocol data is parsed, and an interface associated with a user interface of the controlled end is generated.

In this embodiment of the present invention, the controlling end parses the protocol data, and generates the interface associated with the user interface of the controlled end. In particular, after receiving the JSON protocol data, the controlling end automatically parses the JSON protocol data through a JSON software framework, and generates, through a reflection technology, the interface associated with the user interface of the controlled end.

804: An interface operation instruction is received, action data is generated according to the interface operation instruction, and the action data is sent to the controlled end.

In this embodiment of the present invention, the controlling end receives the interface operation instruction, generates the action data according to the interface operation instruction, and sends the action data to the controlled end. In particular, when a user operates an interface of the controlling end, the controlling end receives the interface operation instruction, generates JSON action data according to the interface operation instruction, and sends the generated JSON action data to the controlled end through a remote diagnosis server.

It should be further noted that, for technical details not described in detail in steps 801 to 804 in this embodiment of the present invention, refer to the specific description of the foregoing embodiment.

The remote automobile diagnostic method provided in this embodiment of the present invention is applied to the controlling end. The controlling end may parse the protocol data, generate the interface associated with the user interface of the controlled end, then receive the interface operation instruction, and generate the action data according to the interface operation instruction and send the action data to the controlled end. In this way, a local diagnosis function is added to the controlling end, and a remote diagnosis function is implemented accordingly, which can implement interface synchronization and action synchronization and has favorable scalability.

Figure 9:
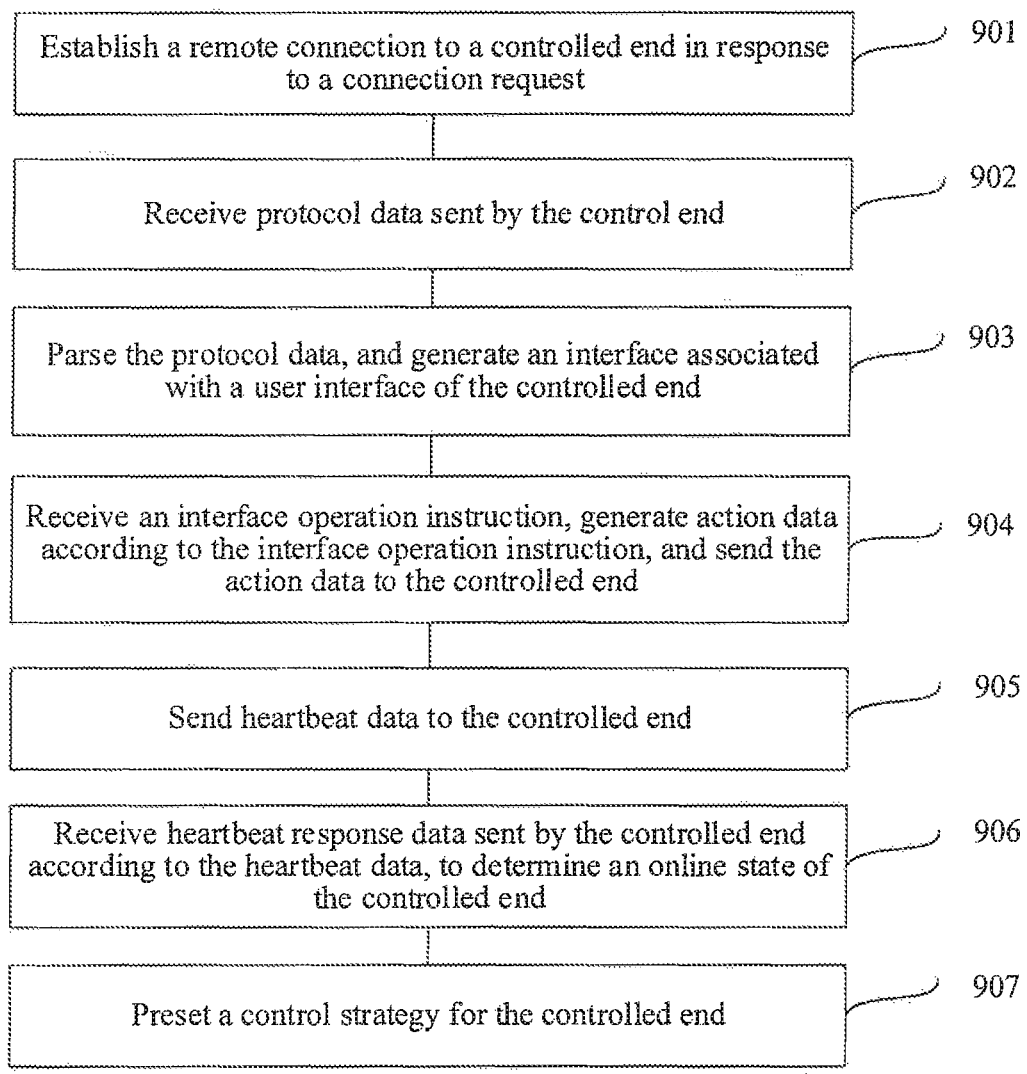
FIG. 9 is a schematic flowchart of a remote automobile diagnostic method according to another embodiment of the present invention.

FIG. 9 is a schematic flowchart of a remote automobile diagnostic method according to an embodiment of the present invention. The remote automobile diagnostic method provided in this embodiment of the present invention is applied to a controlling end and can be performed by the controlling end 40 in FIG. 1, for example, an automobile diagnostic instrument, a desktop computer, a laptop computer, a tablet computer or a smart phone.

Referring to FIG. 9, the method includes the following steps.

901: A remote connection to a controlled end is established in response to a connection request.

In this embodiment of the present invention, the controlling end establishes the remote connection to the controlled end in response to the connection request. In particular, a remote diagnosis request sent by the controlled end is received; remote diagnosis response data is sent to the controlled end according to the remote diagnosis request; and the remote connection to the controlled end is established according to the remote diagnosis response data.

902: Protocol data sent by the controlling end is received.

In this embodiment of the present invention, the controlling end receives the protocol data sent by the controlling end. The protocol data may be JSON protocol data.

903: The protocol data is parsed, and an interface associated with a user interface of the controlled end is generated.

904: An interface operation instruction is received, action data is generated according to the interface operation instruction, and the action data is sent to the controlled end.

In this embodiment of the present invention, the controlling end receives the interface operation instruction, generates the action data according to the interface operation instruction, and sends the action data to the controlled end. In particular, when a user operates an interface of the controlling end, the controlling end receives the interface operation instruction, generates JSON action data according to the interface operation instruction, and sends the generated JSON action data to the controlled end through a remote diagnosis server.

In this embodiment of the present invention, the remote automobile diagnostic method further includes the following steps.

905: Heartbeat data is sent to the controlled end.

In this embodiment of the present invention, the controlling end sends the heartbeat data to the controlled end. The heartbeat data is a small data packet that is sent to another connected party at intervals, and it is determined, based on a response from the other party, whether a communication link between the two connected parties is disconnected.

906: Heartbeat response data sent by the controlled end according to the heartbeat data is received, to determine an online state of the controlled end.

In this embodiment of the present invention, the controlling end receives the heartbeat response data sent by the controlled end according to the heartbeat data, to determine the online state of the controlled end.

Referring to FIG. 6 again, the controlled end sends the heartbeat data and receives the heartbeat response data to monitor at any time whether the controlled end and the controlling end are online.

It should be noted that, in some other embodiments, the data sent and received by the controlled end and the controlling end in a two-way heartbeat may be exchanged. That is, the controlled end sends heartbeat data 00A to the remote diagnosis server. If the remote diagnosis server returns data 00B, it indicates that the controlled end is online. The remote diagnosis server forwards the heartbeat data 00A to the controlling end, and the controlling end returns heartbeat response data 00C to the controlled end. If the controlled end receives the heartbeat response data 00C, it indicates that the controlling end is also online.

907: A control strategy is preset for the controlled end.

In this embodiment of the present invention, the controlling end may preset the control strategy for the controlled end. The control strategy includes: sending data including ID information to the controlled end, and if ID response information sent by the controlled end is received, sending a next piece of data including ID information to the controlled end. The ID information may be randomly generated. Through the control strategy, data can be sent to the controlled end accurately and orderly without being lost. The following provides detailed description through a schematic timing diagram of sending a data response by a controlling end.

Figure 10:
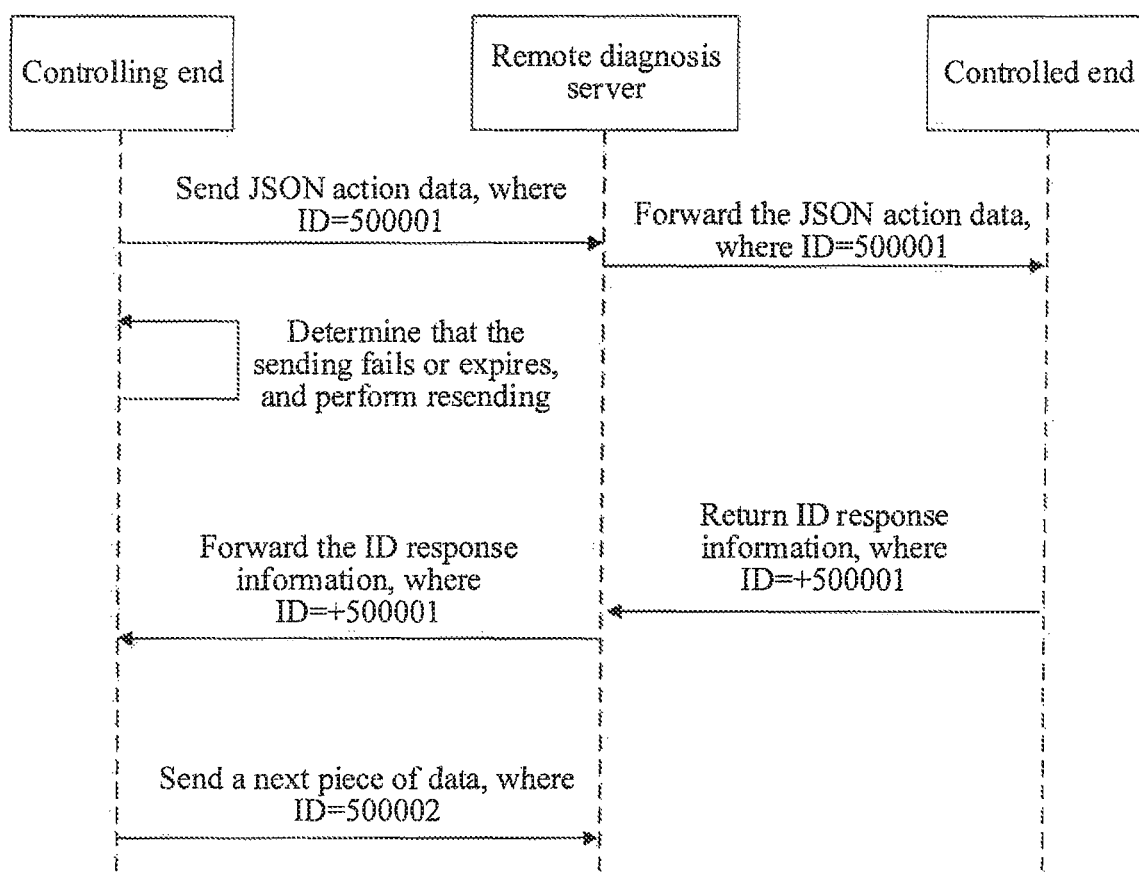
FIG. 10 is a schematic timing diagram of sending a data response by a controlling end according to an embodiment of the present invention.

FIG. 10 is a schematic timing diagram of sending a data response by a controlling end.

The controlling end sends JSON action data, where the JSON protocol data includes ID information such as ID=500001, and is forwarded to the controlled end via a server. If the controlling end receives ID response information such as ID=+500001 that is sent by the controlled end and that is forwarded by a remote diagnosis server, a next piece of data including ID information such as ID=500002 is sent. If the controlling end does not receive the ID response information, it indicates that sending of this piece of data fails or expires, and this piece of data is repeatedly sent until the ID response information is received.

It may be understood that, in some other embodiments, steps 905 to 907 may not be mandatory steps in different embodiments. In addition, according to the description of this embodiment of the present invention, a person of ordinary skill in the art may understand that, steps 901 to 907 may have different execution orders in different embodiments.

It should be further noted that, for technical details not described in detail in steps 901 to 907 in this embodiment of the present invention, refer to the specific description of the foregoing embodiment.

The remote automobile diagnostic method provided in this embodiment of the present invention is applied to the controlling end. The controlling end may parse the protocol data, generate the interface associated with the user interface of the controlled end, then receive the interface operation instruction, and generate the action data according to the interface operation instruction and send the action data to the controlled end. In this way, a local diagnosis function is added to the controlling end, and a remote diagnosis function is implemented accordingly, which can implement interface synchronization and action synchronization and has favorable scalability. In addition, the heartbeat data is sent and the heartbeat response data is received, and each piece of sent data carries a randomly generated ID. In this way, an online state of the controlled end or the controlling end can be monitored at any time, to ensure that data is accurately sent to the controlled end without being lost, so that safety of automobile diagnosis is ensured and a safety accident during the automobile diagnosis is avoided.

Figure 11:
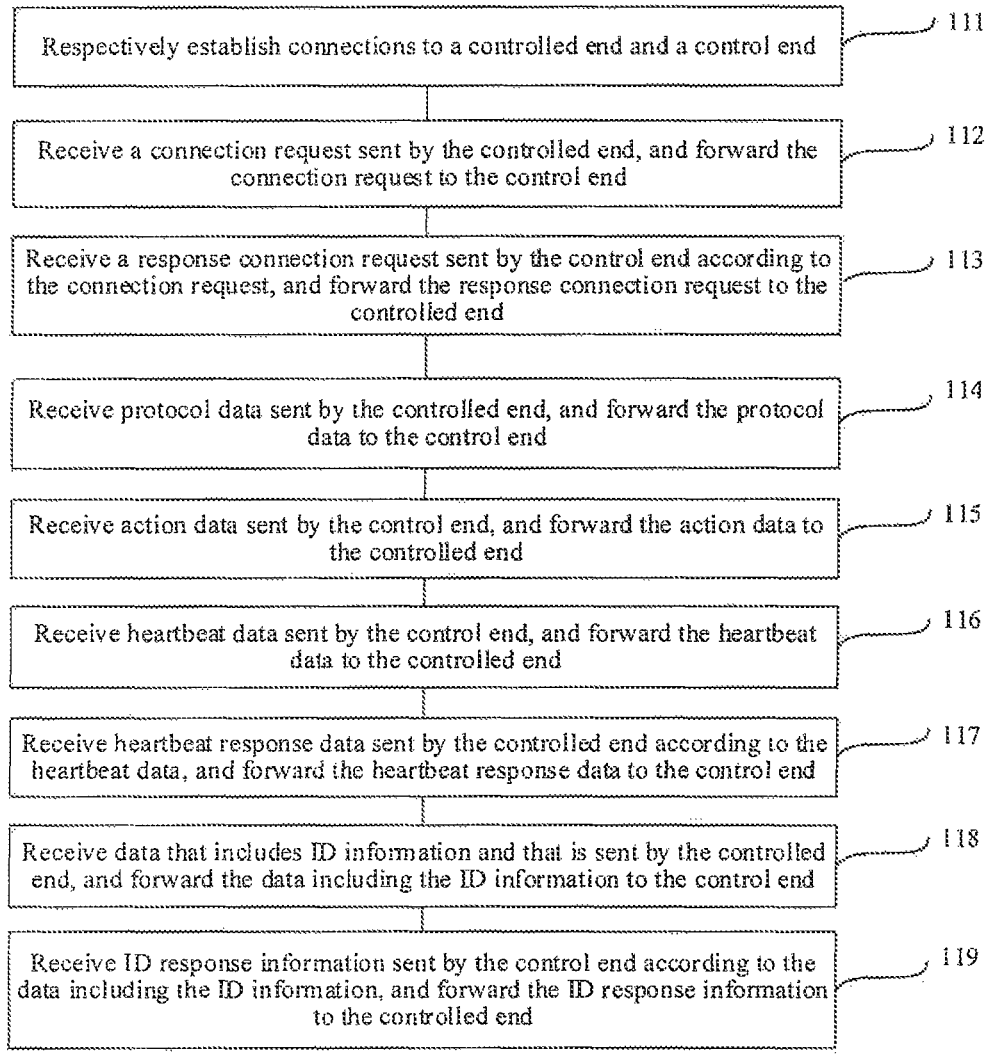
FIG. 11 is a schematic flowchart of a remote automobile diagnostic method according to another embodiment of the present invention.

FIG. 11 is a schematic flowchart of a remote automobile diagnostic method according to another embodiment of the present invention. The remote automobile diagnostic method provided in this embodiment of the present invention is applied to a server and can be performed by the remote diagnosis server 30 in FIG. 1, for example, a traditional server or a cloud server.

Referring to FIG. 11, the method includes the following steps.

111: Connections to a controlled end and a controlling end are respectively established.

In this embodiment of the present invention, the server establishes communication connections to the controlled end and the controlling end to implement data forwarding.

112: A connection request sent by the controlled end is received, and the connection request is forwarded to the controlling end.

113: A response connection request sent by the controlling end according to the connection request is received, and the response connection request is forwarded to the controlled end.

The server forwards the connection request and the response connection request to establish a remote connection between the controlled end and the controlling end.

114: Protocol data sent by the controlled end is received, and the protocol data is forwarded to the controlling end.

115: Action data sent by the controlling end is received, and the action data is forwarded to the controlled end.

The server forwards the protocol data and the action data, to add a local diagnosis function to the controlling end and implement a remote diagnosis function accordingly, so that diagnosis has favorable scalability.

The method further includes the following steps.

116: Heartbeat data sent by the controlling end is received, and the heartbeat data is forwarded to the controlled end.

117: Heartbeat response data sent by the controlled end according to the heartbeat data is received, and the heartbeat response data is forwarded to the controlling end.

The server forwards the heartbeat data and the heartbeat response data to monitor whether the controlled end and the controlling end are online.

118: Data that includes ID information and that is sent by the controlled end is received, and the data including the ID information is forwarded to the controlling end.

119: ID response information sent by the controlling end according to the data including the ID information is received, and the ID response information is forwarded to the controlled end.

The server forwards the data including the ID information and the ID response information, to ensure that data is accurately sent by the controlled end to the controlling end or sent by the controlling end to the controlled end without being lost, so that safety of automobile diagnosis is ensured and a safety accident during the automobile diagnosis is avoided.

It should be noted that, for technical details not described in detail in steps 111 to 119 in this embodiment of the present invention, refer to the specific description of the foregoing embodiment.

In in this embodiment of the present invention, the server forwards the protocol data and the action data, to add a local diagnosis function to the controlling end and implement a remote diagnosis function accordingly, so that diagnosis has favorable scalability.

Figure 12:
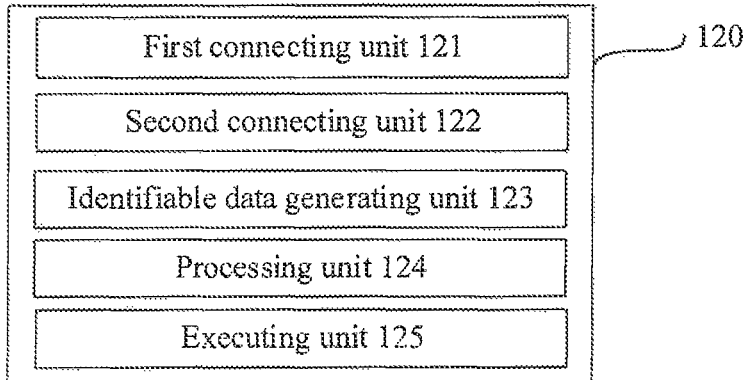
FIG. 12 is a schematic diagram of a remote automobile diagnostic apparatus according to an embodiment of the present invention.

FIG. 12 is a schematic diagram of a remote automobile diagnostic apparatus according to an embodiment of the present invention. The remote automobile diagnostic apparatus provided in this embodiment of the present invention is applied to a controlled end, and can be performed by the controlled end 20 in FIG. 1. For example, the controlled end may be an automobile diagnostic instrument, a laptop computer, a tablet computer or a smart phone.

Referring to FIG. 12, the apparatus 120 includes a first connecting unit 121, a second connecting unit 122, an identifiable data generating unit 123, a processing unit 124 and an executing unit 125.

The first connecting unit 121 is configured to send a connection request to establish a remote connection to a controlling end.

The second connecting unit 122 is configured to establish a communication connection to a to-be-diagnosed device.

The identifiable data generating unit 123 is configured to generate identifiable data according to information about the to-be-diagnosed device.

In this embodiment of the present invention, the identifiable data generating unit 123 generates the identifiable data according to the information about the to-be-diagnosed device. The identifiable data is data that can be identified by upper-layer software. From a software development perspective, software may include upper-layer software and lower-layer software. The upper-layer software (an interface, an application, or the like) mainly provides human-computer interaction and technical support, and the lower-layer software (embedded software, a driver, or the like) mainly provides an execution function and a feedback function.

The processing unit 124 is configured to generate a user interface and protocol data according to the identifiable data, and send the protocol data to the controlling end.

In this embodiment of the present invention, the processing unit 124 generates the user interface and the protocol data according to the identifiable data, and sends the protocol data to the controlling end. The protocol data may be JSON protocol data. JSON is a lightweight data format for Internet transmission, and is easy for people to read and write and is also easy for machines to parse and generate, thereby improving network transmission efficiency. The processing unit 124 generates the user interface to provide intuitive display for a user. The processing unit 124 automatically generates a JSON software framework to generate the JSON protocol data. The processing unit 124 sends the JSON protocol data to the controlling end through forwarding of a remote diagnosis server.

The executing unit 125 is configured to receive action data sent by the controlling end according to the protocol data, and execute a diagnosis action corresponding to the action data on the user interface to complete diagnosis of the to-be-diagnosed device.

In this embodiment of the present invention, the executing unit 125 receives the action data, where the action data is data generated according to an action, and the action data may be JSON action data; and executes a corresponding file and a corresponding function through a reflection technology, and executes a corresponding diagnosis action according to a diagnosis command to diagnose the to-be-diagnosed device. The reflection technology is a technology in a programming language in which corresponding logic can be run by knowing file and function names. Through the reflection technology, interfaces and actions of the controlled end and the controlling end can be synchronized.

It should be noted that, in this embodiment of the present invention, the remote automobile diagnostic apparatus 120 can perform the remote automobile diagnostic method that is applied to the controlled end and provided in the embodiments of the present invention, and has corresponding functional modules and beneficial effects for performing the method.

For technical details that are not described in detail in the embodiment of the remote automobile diagnostic apparatus 120, refer to the remote automobile diagnostic method that is applied to the controlled end and provided in the embodiments of the present invention.

Figure 13:
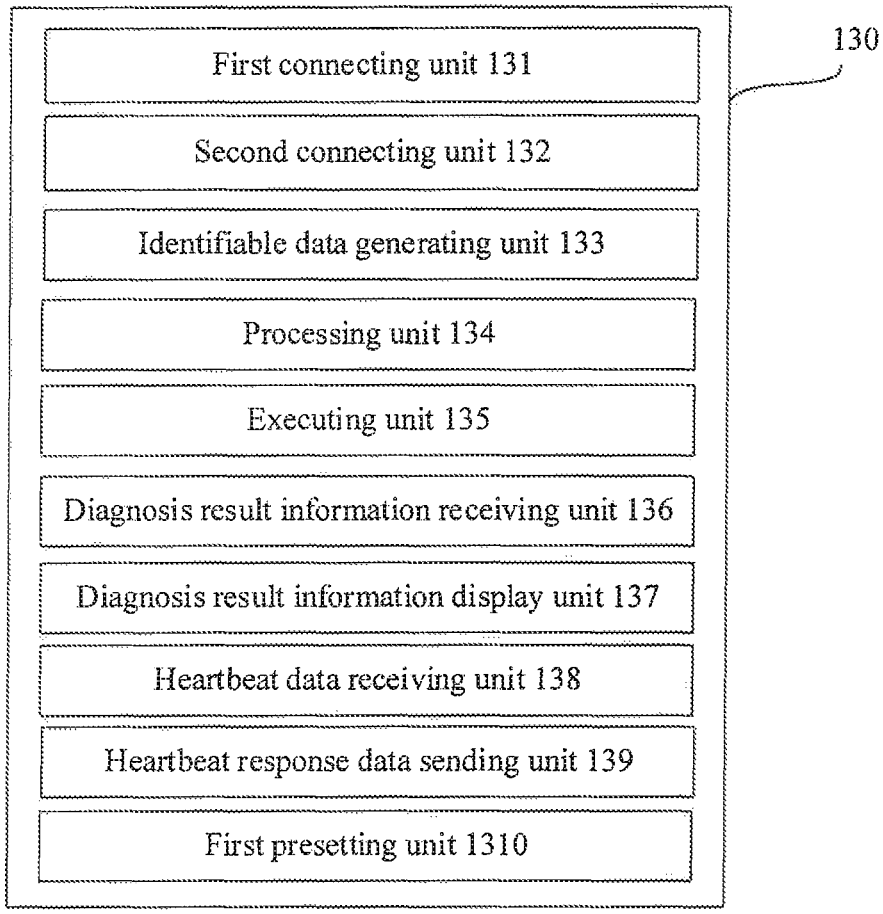
FIG. 13 is a schematic diagram of a remote automobile diagnostic apparatus according to another embodiment of the present invention.

FIG. 13 is a schematic diagram of a remote automobile diagnostic apparatus according to another embodiment of the present invention. The remote automobile diagnostic apparatus provided in the another embodiment of the present invention is applied to a controlled end and can be performed by the controlled end 20 in FIG. 1. For example, the controlled end may be an automobile diagnostic instrument, a laptop computer, a tablet computer or a smart phone.

Referring to FIG. 13, the apparatus 130 includes a first connecting unit 131, a second connecting unit 132, an identifiable data generating unit 133, a processing unit 134 and an executing unit 135.

The first connecting unit 131 is configured to send a connection request to establish a remote connection to a controlling end.

In this embodiment of the present invention, the first connecting unit 131 is specifically configured to: send a remote diagnosis request to the controlling end; receive remote diagnosis response data sent by the controlling end according to the remote diagnosis request; and establish the remote connection to the controlling end according to the remote diagnosis response data.

The second connecting unit 132 is configured to establish a communication connection to a to-be-diagnosed device.

The identifiable data generating unit 133 is configured to generate identifiable data according to information about the to-be-diagnosed device.

In this embodiment of the present invention, the identifiable data generating unit 133 generates the identifiable data according to the information about the to-be-diagnosed device. The information about the to-be-diagnosed device includes diagnosis request data. The identifiable data generating unit 133 is specifically configured to: send a fault code reading instruction to the to-be-diagnosed device according to the diagnosis request data, read and translate a fault code, and generate the identifiable data.

The processing unit 134 is configured to generate a user interface and protocol data according to the identifiable data, and send the protocol data to the controlling end.

In this embodiment of the present invention, the processing unit 134 generates the user interface and the protocol data according to the identifiable data, and sends the protocol data to the controlling end. The protocol data may be JSON protocol data. The processing unit 134 generates the user interface to provide intuitive display for a user. The processing unit 134 automatically generates a JSON software framework to generate the JSON protocol data. The JSON protocol data is sent to the controlling end through forwarding of a remote diagnosis server.

The executing unit 135 is configured to receive action data sent by the controlling end according to the protocol data, and execute a diagnosis action corresponding to the action data on the user interface to complete diagnosis of the to-be-diagnosed device.

In this embodiment of the present invention, the executing unit 135 receives the action data, where the action data is data generated according to an action, and the action data may be JSON action data; and executes a corresponding file and a corresponding function through a reflection technology, and executes a corresponding diagnosis action according to a diagnosis command to diagnose the to-be-diagnosed device. The reflection technology is a technology in a programming language in which corresponding logic can be run by knowing file and function names. Through the reflection technology, interfaces and actions of the controlled end and the controlling end can be synchronized. The diagnosis action includes a selection action of a diagnosis parameter and an execution action of a diagnosis event. The executing unit 135 is further configured to: when the diagnosis action is the selection action of the diagnosis parameter, select a corresponding diagnosis parameter or option on the user interface; and when the diagnosis action is the execution action of the diagnosis event, send a diagnosis instruction corresponding to the execution action of the diagnosis event to the to-be-diagnosed device.

In this embodiment of the present invention, the remote automobile diagnostic apparatus 130 further includes a diagnosis result information receiving unit 136, a diagnosis result information display unit 137, a heartbeat data receiving unit 138, a heartbeat response data sending unit 139 and a first presetting unit 1310.

The diagnosis result information receiving unit 136 is configured to receive diagnosis result information returned by the to-be-diagnosed device according to the diagnosis instruction.

The diagnosis result information display unit 137 is configured to display the diagnosis result information on the user interface.

The heartbeat data receiving unit 138 is configured to receive heartbeat data sent by the controlling end.

In this embodiment of the present invention, the heartbeat data receiving unit 138 receives the heartbeat data sent by the controlling end. The heartbeat data is a small data packet that is sent to another connected party at intervals, and it is determined, based on a response from the other party, whether a communication link between the two connected parties is disconnected.

The heartbeat response data sending unit 139 is configured to send heartbeat response data to the controlling end according to the heartbeat data.

In this embodiment of the present invention, the heartbeat response data sending unit 139 sends the heartbeat response data to the controlling end according to the heartbeat data.

The heartbeat data receiving unit 138 receives the heartbeat data and the heartbeat response data sending unit 139 sends the heartbeat response data to monitor at any time whether the controlled end and the controlling end are online. If the controlled end and the controlling end are not online, a reminder can be provided in time to reconnect and continue remote diagnosis.

The first presetting unit 1310 is configured to preset a control strategy for the controlling end.

In this embodiment of the present invention, the first presetting unit 1310 may preset the control strategy for the controlling end. The control strategy includes: sending data including ID information to the controlling end, and if ID response information sent by the controlling end is received, sending a next piece of data including ID information to the controlling end. The ID information may be randomly generated. Through the control strategy, data can be sent to controlling end accurately and orderly without being lost.

It should be noted that, in this embodiment of the present invention, the remote automobile diagnostic apparatus 130 can perform the remote automobile diagnostic method that is applied to the controlled end and provided in the embodiments of the present invention, and has corresponding functional modules and beneficial effects for performing the method. For technical details that are not described in detail in the embodiment of the remote automobile diagnostic apparatus 130, refer to the remote automobile diagnostic method that is applied to the controlled end and provided in the embodiments of the present invention.

Figure 14:
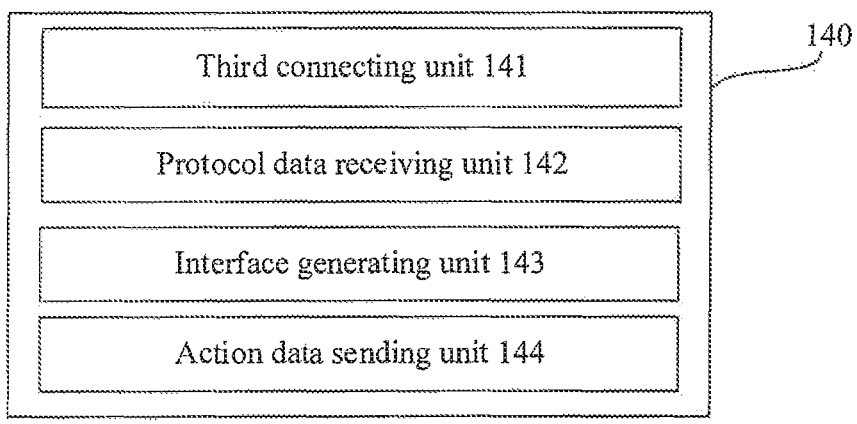
FIG. 14 is a schematic diagram of a remote automobile diagnostic apparatus according to another embodiment of the present invention.

FIG. 14 is a schematic diagram of a remote automobile diagnostic apparatus according to another embodiment of the present invention. The remote automobile diagnostic apparatus provided in the another embodiment of the present invention is applied to a controlling end and can be performed by the controlling end 40 in FIG. 1. For example, the controlling end may be an automobile diagnostic instrument, a desktop computer, a laptop computer, a tablet computer or a smart phone.

Referring to FIG. 14, the apparatus 140 includes a third connecting unit 141, a protocol data receiving unit 142, an interface generating unit 143 and an action data sending unit 144.

The third connecting unit 141 is configured to establish a remote connection to a controlled end in response to a connection request.

The protocol data receiving unit 142 is configured to receive protocol data sent by the controlling end.

In this embodiment of the present invention, the protocol data receiving unit 142 receives the protocol data sent by the controlling end. The protocol data may be JSON protocol data. JSON is a lightweight data format for Internet transmission, and is easy for people to read and write and is also easy for machines to parse and generate, thereby improving network transmission efficiency.

The interface generating unit 143 is configured to parse the protocol data, and generate an interface associated with a user interface of the controlled end.

In this embodiment of the present invention, the interface generating unit 143 parses the protocol data, and generates the interface associated with the user interface of the controlled end. Specifically, after receiving the JSON protocol data, the interface generating unit 143 automatically parses the JSON protocol data through a JSON software framework, and generates, through a reflection technology, the interface associated with the user interface of the controlled end.

The action data sending unit 144 is configured to receive an interface operation instruction, generate action data according to the interface operation instruction, and send the action data to the controlled end.

In this embodiment of the present invention, the action data sending unit 144 receives the interface operation instruction, generates the action data according to the interface operation instruction, and sends the action data to the controlled end. In particular, when a user operates an interface of the controlling end, the action data sending unit 144 receives the interface operation instruction, generates JSON action data according to the interface operation instruction, and sends the generated JSON action data to the controlled end through a remote diagnosis server.

It should be noted that, in this embodiment of the present invention, the remote automobile diagnostic apparatus 140 can perform the remote automobile diagnostic method that is applied to the controlling end and provided in the embodiments of the present invention, and has corresponding functional modules and beneficial effects for performing the method. For technical details that are not described in detail in the embodiment of the remote automobile diagnostic apparatus 140, refer to the remote automobile diagnostic method that is applied to the controlling end and provided in the embodiments of the present invention.

Figure 15:
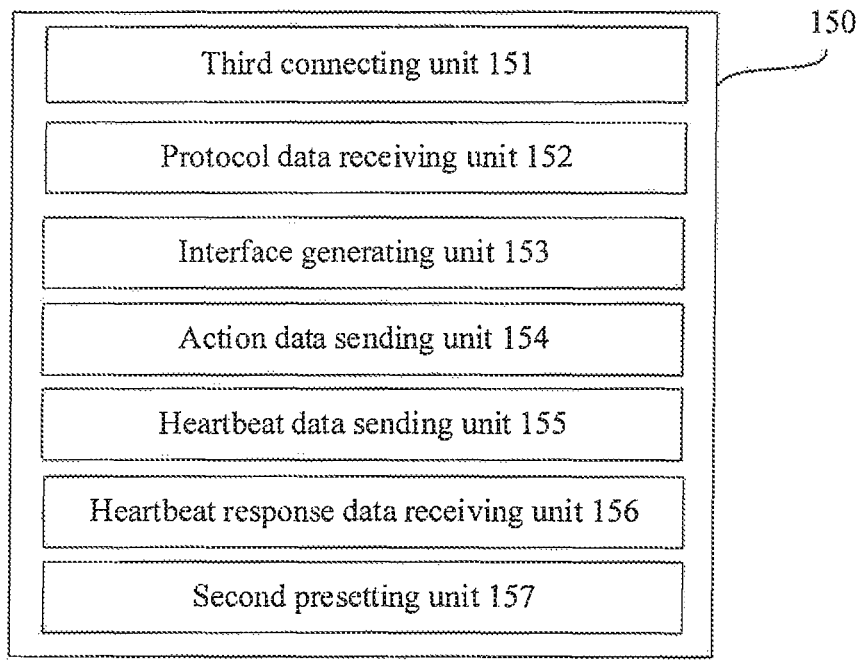
FIG. 15 is a schematic diagram of a remote automobile diagnostic apparatus according to another embodiment of the present invention.

FIG. 15 is a schematic diagram of a remote automobile diagnostic apparatus according to another embodiment of the present invention. The remote automobile diagnostic apparatus provided in the another embodiment of the present invention is applied to a controlling end and can be performed by the controlling end 40 in FIG. 1. For example, the controlling end may be an automobile diagnostic instrument, a desktop computer, a laptop computer, a tablet computer or a smart phone.

Referring to FIG. 15, the apparatus 150 includes a third connecting unit 151, a protocol data receiving unit 152, an interface generating unit 153 and an action data sending unit 154.

The third connecting unit 151 is configured to establish a remote connection to a controlled end in response to a connection request.

In this embodiment of the present invention, the second connecting unit 151 is specifically configured to: receive a remote diagnosis request sent by the controlled end; sending remote diagnosis response data to the controlled end according to the remote diagnosis request; and establish the remote connection to the controlled end according to the remote diagnosis response data.

The protocol data receiving unit 152 is configured to receive protocol data sent by the controlling end.

In this embodiment of the present invention, the protocol data receiving unit 152 receives the protocol data sent by the controlling end. The protocol data may be JSON protocol data.

The interface generating unit 153 is configured to parse the protocol data, and generate an interface associated with a user interface of the controlled end.

The action data sending unit 154 is configured to receive an interface operation instruction, generate action data according to the interface operation instruction, and send the action data to the controlled end.

In this embodiment of the present invention, the action data sending unit 154 receives the interface operation instruction, generates the action data according to the interface operation instruction, and sends the action data to the controlled end. In particular, when a user operates an interface of the controlling end, the action data sending unit 154 receives the interface operation instruction, generates JSON action data according to the interface operation instruction, and sends the generated JSON action data to the controlled end through a remote diagnosis server.

In this embodiment of the present invention, the apparatus 150 further includes a heartbeat data sending unit 155, a heartbeat response data receiving unit 156 and a second presetting unit 157.

The heartbeat data sending unit 155 is configured to send heartbeat data to the controlled end.

In this embodiment of the present invention, the heartbeat data sending unit 155 sends the heartbeat data to the controlled end. The heartbeat data is a small data packet that is sent to another connected party at intervals, and it is determined, based on a response from the other party, whether a communication link between the two connected parties is disconnected.

The heartbeat response data receiving unit 156 is configured to receive heartbeat response data sent by the controlled end according to the heartbeat data, to determine an online state of the controlled end.

In this embodiment of the present invention, the heartbeat data sending unit 155 sends the heartbeat data and the heartbeat response data receiving unit 156 receives the heartbeat response data to monitor at any time whether the controlled end and the controlling end are online. If the controlled end and the controlling end are not online, a reminder can be provided in time to reconnect and continue remote diagnosis.

The second presetting unit 157 is configured to preset a control strategy for the controlled end.

In this embodiment of the present invention, the second presetting unit 157 may preset the control strategy for the controlled end. The control strategy includes: sending data including ID information to the controlled end, and if ID response information sent by the controlled end is received, sending a next piece of data including ID information to the controlled end. The ID information may be randomly generated. Through the control strategy, data can be sent to the controlled end accurately and orderly without being lost.

It should be noted that, in this embodiment of the present invention, the remote automobile diagnostic apparatus 150 can perform the remote automobile diagnostic method that is applied to the controlling end and provided in the embodiments of the present invention, and has corresponding functional modules and beneficial effects for performing the method. For technical details that are not described in detail in the embodiment of the remote automobile diagnostic apparatus 150, refer to the remote automobile diagnostic method that is applied to the controlling end and provided in the embodiments of the present invention.

Figure 16:
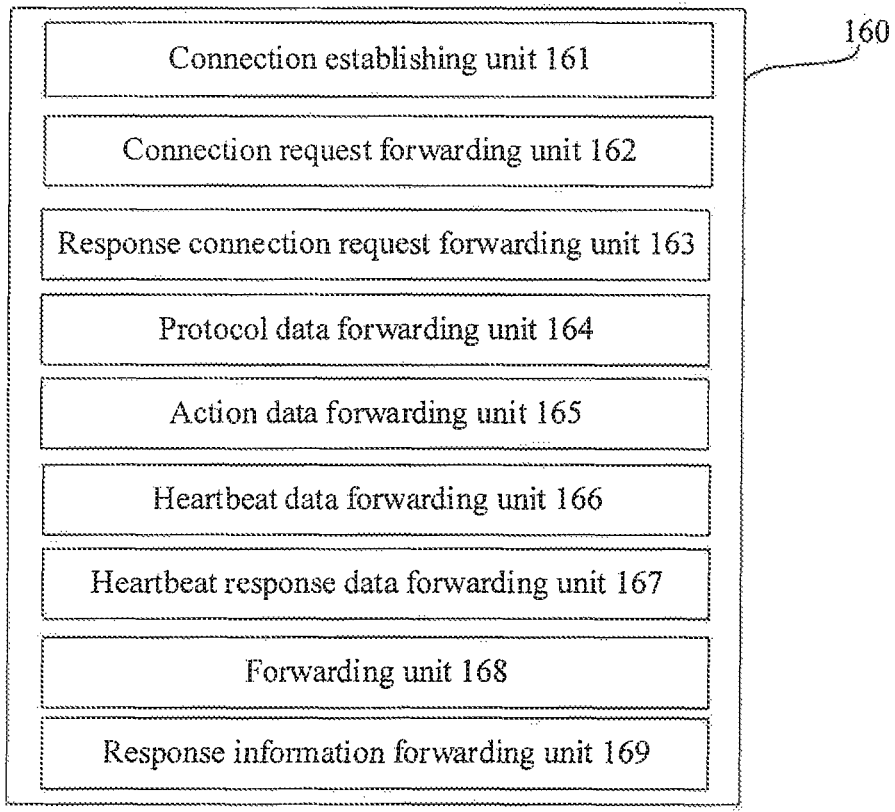
FIG. 16 is a schematic diagram of a remote automobile diagnostic apparatus according to another embodiment of the present invention.

FIG. 16 is a schematic diagram of a remote automobile diagnostic apparatus according to another embodiment of the present invention. The remote automobile diagnostic apparatus provided in the another embodiment of the present invention is applied to a server and can be performed by the remote diagnosis server 30 in FIG. 1, for example, a traditional server or a cloud server.

Referring to FIG. 16, the apparatus includes a connection establishing unit 161, a connection request forwarding unit 162, a response connection request forwarding unit 163, a protocol data forwarding unit 164 and an action data forwarding unit 165.

The connection establishing unit 161 is configured to respectively establish connections to a controlled end and a controlling end.

The connection request forwarding unit 162 is configured to receive a connection request sent by the controlled end, and forward the connection request to the controlling end.

The response connection request forwarding unit 163 is configured to receive a response connection request sent by the controlling end according to the connection request, and forward the response connection request to the controlled end.

The connection request forwarding unit 162 forwards the connection request and the response connection request forwarding unit 163 forwards the response connection request to implement a remote connection between the controlled end and the controlling end.

The protocol data forwarding unit 164 is configured to receive protocol data sent by the controlled end, and forward the protocol data to the controlling end.

The action data forwarding unit 165 is configured to receive action data sent by the controlling end, and forward the action data to the controlled end.

The protocol data forwarding unit 164 forwards the protocol data and the action data forwarding unit 165 forwards the action data, to add a local diagnosis function to the controlling end and implement a remote diagnosis function accordingly, so that diagnosis has favorable scalability.

In this embodiment of the present invention, the apparatus further includes a heartbeat data forwarding unit 166, a heartbeat response data forwarding unit 167, a forwarding unit 168 and a response information forwarding unit 169.

The heartbeat data forwarding unit 166 is configured to receive heartbeat data sent by the controlling end, and forward the heartbeat data to the controlled end.

The heartbeat response data forwarding unit 167 is configured to receive heartbeat response data sent by the controlled end according to the heartbeat data, and forward the heartbeat response data to the controlling end.

The heartbeat data forwarding unit 166 forwards the heartbeat data and the heartbeat response data forwarding unit 167 forwards the heartbeat response data to monitor whether the controlled end and the controlling end are online.

The forwarding unit 168 is configured to receive data that includes ID information and that is sent by the controlled end, and forward the data including the ID information to the controlling end.

The response information forwarding unit 169 is configured to receive ID response information sent by the controlling end according to the data including the ID information, and forward the ID response information to the controlled end.

The forwarding unit 168 forwards the data including the ID information and the response information forwarding unit 169 forwards the ID response information, to ensure that data is accurately sent by the controlled end to the controlling end or sent by the controlling end to the controlled end without being lost, so that safety of automobile diagnosis is ensured and a safety accident during the automobile diagnosis is avoided.

It should be noted that, in this embodiment of the present invention, the remote automobile diagnostic apparatus 160 can perform the remote automobile diagnostic method that is applied to the server and provided in the embodiments of the present invention, and has corresponding functional modules and beneficial effects for performing the method. For technical details that are not described in detail in the embodiment of the remote automobile diagnostic apparatus 160, refer to the remote automobile diagnostic method that is applied to the server and provided in the embodiments of the present invention.

Figure 17:
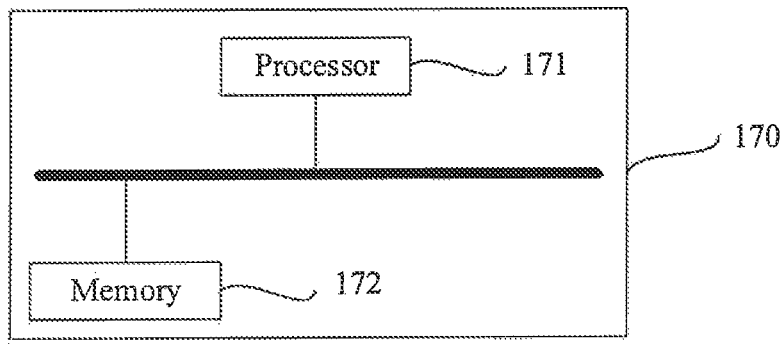
FIG. 17 is a schematic structural diagram of hardware of a mobile terminal according to an embodiment of the present invention.

FIG. 17 is a schematic structural diagram of hardware of a mobile terminal according to an embodiment of the present invention. As shown in FIG. 17, the mobile terminal 170 includes:

one or more processors 171 and a memory 172. One processor 171 is used as an example in FIG. 17.

The processor 171 and the memory 172 may be connected through a bus or in other manners. In FIG. 17, that the processor and the memory are connected through a bus is used as an example.

The memory 172, as a non-volatile computer readable storage medium, may be configured to store a non-volatile software program, a non-volatile computer executable program, and a module, such as program instructions/units corresponding to the remote automobile diagnostic method that is applied to the controlled end and provided in the embodiments of the present invention (for example, the first connecting unit 131, the second connecting unit 132, the identifiable data generating unit 133, the processing unit 134, the executing unit 135, the diagnosis result information receiving unit 136, the diagnosis result information display unit 137, the heartbeat data receiving unit 138, the heartbeat response data sending unit 139 and the first presetting unit 1310 shown in FIG. 13). The processor 171 runs the non-volatile software program, the instructions, and the units that are stored in the memory 172, to perform various function applications of the mobile terminal and data processing, that is, implement the remote automobile diagnostic method in the method embodiment.

The memory 172 may include a program storage area and a data storage area. The program storage area may store an operating system, an application program required for at least one function. The data storage area may store data and the like created according to use of the mobile terminal. In addition, the memory 172 may include a high speed random access memory, and may further include a non-volatile memory, such as at least one magnetic disk memory device, a flash memory device, or other non-volatile solid-state memory devices. In some embodiments, the memory 172 may optionally include memories remotely disposed relative to the processor 171, and these remote memories may be connected to the mobile terminal via a network. Examples of the network include but are not limited to an Internet, an intranet, a local area network, a mobile communication network and a combination thereof.

The one or more units are stored in the memory 172, and when executed by the one or more processors 171, perform the remote automobile diagnostic method that is applied to the controlled end and provided in the embodiments of the present invention. For example, steps 401 to 405 of the method in FIG. 4 or steps 501 to 510 of the method in FIG. 5 described above are performed to implement functions of the units 121 to 125 in FIG. 12 or functions of the units 131 to 1310 in FIG. 13.

The mobile terminal can perform the remote automobile diagnostic method that is applied to the controlled end and provided in the embodiments of the present invention, and has corresponding functional modules and beneficial effects for performing the method. For technical details that are not described in detail in the embodiment of the mobile terminal, refer to the remote automobile diagnostic method that is applied to the controlled end and provided in the embodiments of the present invention.

An embodiment of the present invention provides a computer program product including a computer program stored on a non-volatile computer readable storage medium, the computer program including program instructions that, when executed by a mobile terminal, cause the mobile terminal to perform the remote automobile diagnostic method that is applied to the controlled end and provided in the embodiments of the present invention. For example, steps 401 to 405 of the method in FIG. 4 or steps 501 to 510 of the method in FIG. 5 described above are performed to implement functions of the units 121 to 125 in FIG. 12 or functions of the units 131 to 1310 in FIG. 13.

An embodiment of the present invention provides a non-volatile computer readable storage medium storing computer executable instructions that cause a terminal to perform the remote automobile diagnostic method that is applied to the controlled end and provided in the embodiments of the present invention. For example, steps 401 to 405 of the method in FIG. 4 or steps 501 to 510 of the method in FIG. 5 described above are performed to implement functions of the units 121 to 125 in FIG. 12 or functions of the units 131 to 1310 in FIG. 13.

The mobile terminal in this embodiment of the present application may exist in various forms, including but not limited to:

(1) Mobile communication device: Such devices are compact and portable. A plurality of application programs may be installed to implement various functions such as a remote automobile diagnostic function. Such terminals include a smart phone, a multimedia phone, a functional phone and the like.

(2) Ultra-mobile personal computer device: Such devices belong to a scope of personal computers, and various applications may be installed on a mobile phone with a large screen. Such terminals include a PDA, an MID, a UMPC device, and the like.

(3) Other mobile terminals with a remote automobile diagnostic function, such as a laptop computer.

Figure 18:
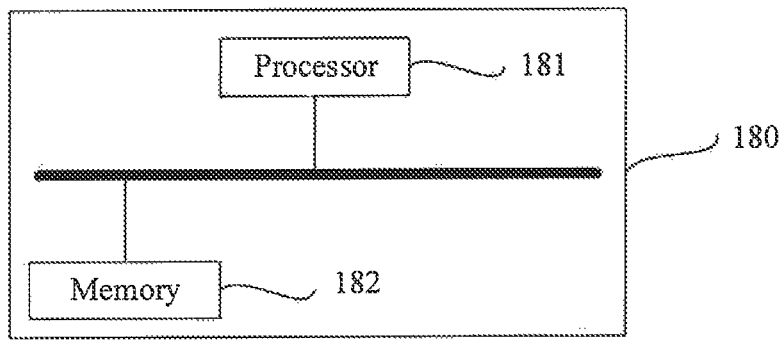
FIG. 18 is a schematic structural diagram of hardware of an electronic device according to an embodiment of the present invention.

FIG. 18 is a schematic structural diagram of hardware of an electronic device according to an embodiment of the present invention. As shown in FIG. 18, the electronic device 180 includes:

one or more processors 181 and a memory 182. One processor 181 is used as an example in FIG. 18.

The processor 181 and the memory 182 may be connected through a bus or in other manners. In FIG. 18, that the processor and the memory are connected through a bus is used as an example.

The memory 182, as a non-volatile computer readable storage medium, may be configured to store a non-volatile software program, a non-volatile computer executable program, and a module, such as program instructions/units corresponding to the remote automobile diagnostic method that is applied to the controlling end and provided in the embodiments of the present invention (for example, the third connecting unit 151, the protocol data receiving unit 152, the interface generating unit 153, the action data sending unit 154, the heartbeat data sending unit 155, the heartbeat response data receiving unit 156 and the second presetting unit 157 shown in FIG. 15). The processor 181 runs the non-volatile software program, the instructions, and the units that are stored in the memory 182, to perform various function applications of the electronic device and data processing, that is, implement the remote automobile diagnostic method in the method embodiment.

The memory 182 may include a program storage area and a data storage area. The program storage area may store an operating system and an application program required for at least one function. The data storage area may store data and the like created according to use of the electronic device. In addition, the memory 182 may include a high speed random access memory, and may further include a non-volatile memory, such as at least one magnetic disk memory device, a flash memory device, or other non-volatile solid-state memory devices. In some embodiments, the memory 182 may optionally include memories remotely disposed relative to the processor 181, and these remote memories may be connected to the electronic device via a network. Examples of the network include but are not limited to an Internet, an intranet, a local area network, a mobile communication network and a combination thereof.

The one or more units are stored in the memory 182, and when executed by the one or more processors 181, perform the remote automobile diagnostic method that is applied to the controlling end and provided in the embodiments of the present invention. For example, steps 801 to 804 of the method in FIG. 8 or steps 901 to 907 of the method in FIG. 9 described above are performed to implement functions of the units 141 to 144 in FIG. 13 or functions of the units 151 to 157 in FIG. 14.

The electronic device can perform the remote automobile diagnostic method that is applied to the controlling end and provided in the embodiments of the present invention, and has corresponding functional modules and beneficial effects for performing the method. For technical details that are not described in detail in the embodiment of the electronic device, refer to the remote automobile diagnostic method that is applied to the controlling end and provided in the embodiments of the present invention.

An embodiment of the present invention provides a computer program product including a computer program stored on a non-volatile computer readable storage medium, the computer program including program instructions that, when executed by an electronic device, cause the electronic device to perform the remote automobile diagnostic method that is applied to the controlling end and provided in the embodiments of the present invention. For example, steps 801 to 804 of the method in FIG. 8 or steps 901 to 907 of the method in FIG. 9 described above are performed to implement functions of the units 141 to 144 in FIG. 13 or functions of the units 151 to 157 in FIG. 14.

An embodiment of the present invention provides a non-volatile computer readable storage medium storing computer executable instructions that cause a terminal to perform the remote automobile diagnostic method that is applied to a controlling end and provided in the embodiments of the present invention. For example, steps 801 to 804 of the method in FIG. 8 or steps 901 to 907 of the method in FIG. 9 described above are performed to implement functions of the units 141 to 144 in FIG. 13 or functions of the units 151 to 157 in FIG. 14.

The electronic device in this embodiment of the present application may exist in various forms, including but not limited to:

(1) Mobile communication device: Such devices are compact and portable. A plurality of application programs may be installed to implement various functions such as a remote automobile diagnostic function. Such terminals include a smart phone, a multimedia phone, a functional phone and the like.

(2) Ultra-mobile personal computer device: Such devices belong to a scope of personal computers, and various applications may be installed on a mobile phone with a large screen. Such terminals include a PDA, an MID, a UMPC device, and the like.

(3) Other electronic devices with a remote automobile diagnostic function, such as a desktop computer and a laptop computer.

Figure 19:
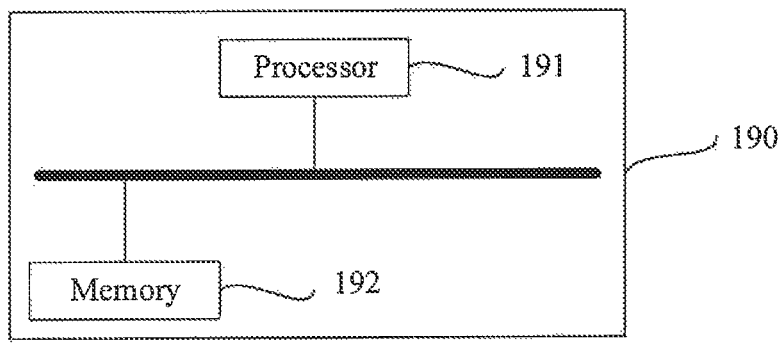
FIG. 19 is a schematic structural diagram of hardware of a server according to an embodiment of the present invention.

FIG. 19 is a schematic structural diagram of hardware of a server according to an embodiment of the present invention. As shown in FIG. 19, the server 190 includes:

one or more processors 191 and a memory 192. One processor 191 is used as an example in FIG. 19.

The processor 191 and the memory 192 may be connected through a bus or in other manners. In FIG. 19, that the processor and the memory are connected through a bus is used as an example.

The memory 192, as a non-volatile computer readable storage medium, may be configured to store a non-volatile software program, a non-volatile computer executable program, and a module, such as program instructions/units corresponding to the remote automobile diagnostic method that is applied to the server and provided in the embodiments of the present invention (for example, the connection establishing unit 161, the connection request forwarding unit 162, the response connection request forwarding unit 163, the protocol data forwarding unit 164, the action data forwarding unit 165, the heartbeat data forwarding unit 166, the heartbeat response data forwarding unit 167, the forwarding unit 168 and the response information forwarding unit 169 shown in FIG. 16). The processor 191 runs the non-volatile software program, the instructions, and the units that are stored in the memory 192, to perform various function applications of the server and data processing, that is, implement the remote automobile diagnostic method in the method embodiment.

The memory 192 may include a program storage area and a data storage area. The program storage area may store an operating system, an application program required for at least one function. The data storage area may store data and the like created according to use of the server. In addition, the memory 192 may include a high speed random access memory, and may further include a non-volatile memory, such as at least one magnetic disk memory device, a flash memory device, or other non-volatile solid-state memory devices. In some embodiments, the memory 192 may optionally include remotely located memories relative to the processor 191 and these remote memories may be connected to the server via a network.

Examples of the network include but are not limited to an Internet, an intranet, a local area network, a mobile communication network and a combination thereof.

The one or more units are stored in the memory 192, and when executed by the one or more processors 191, perform the remote automobile diagnostic method that is applied to the server and provided in the embodiments of the present invention. For example, steps 111 to 119 of the method in FIG. 11 described above are performed to implement functions of the units 161 to 169 in FIG. 16.

The server can perform the remote automobile diagnostic method that is applied to the server and provided in the embodiments of the present invention, and has corresponding functional modules and beneficial effects for performing the method. For technical details that are not described in detail in the embodiment of the server, refer to the remote automobile diagnostic method that is applied to the server and provided in the embodiments of the present invention.

An embodiment of the present invention provides a computer program product including a computer program stored on a non-volatile computer readable storage medium, the computer program including program instructions that, when executed by a server, cause the server to perform the remote automobile diagnostic method that is applied to the server and provided in the embodiments of the present invention. For example, steps 111 to 119 of the method in FIG. 11 described above are performed to implement functions of the units 161 to 169 in FIG. 16.

An embodiment of the present invention provides a non-volatile computer readable storage medium storing computer executable instructions that cause a terminal to perform the remote automobile diagnostic method that is applied to the server and provided in the embodiments of the present invention. For example, steps 111 to 119 of the method in FIG. 11 described above are performed to implement functions of the units 161 to 169 in FIG. 16.

It should be noted that the described apparatus embodiment is merely exemplary. The units described as separate parts may or may not be physically separate, and parts displayed as units may or may not be physical units, may be located in one position, or may be distributed on a plurality of network units. Some or all modules thereof may be selected based on an actual requirement, to implement an objective of the solution in this embodiment.

Based on the foregoing descriptions of the embodiments, a person of ordinary skill in the art may clearly understand that the embodiments may be implemented by software in addition to a general hardware platform or by hardware. A person of ordinary skill in the art may understand that all or some of the procedures of the methods in the embodiments may be implemented by using a computer program instructing relevant hardware. The program may be stored in a computer-readable storage medium. When the program runs, the procedures of the methods in the embodiments are performed. The foregoing storage medium may include a read-only memory (ROM), a random access memory (RAM), or the like.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A remote automobile diagnostic method applied to a controlled end, comprising:
    sending a connection request to establish a remote connection to a controlling end;
    establishing a communication connection to a to-be-diagnosed device;
    generating identifiable data according to information about the to-be-diagnosed device;
    generating a user interface of the controlled end and JavaScript object notation (JSON) protocol data according to the identifiable data, and sending the JSON protocol data to the controlling end, so that the controlling end generates a synchronization interface associated with the user interface; and
    receiving action data sent by the controlling end according to the JSON protocol data, and executing a diagnosis action corresponding to the action data on the user interface to complete diagnosis of the to-be-diagnosed device;
    presetting a control strategy for the controlling end, the control strategy comprising:
    sending data comprising ID information to the controlling end, and if ID response information sent by the controlling end is received, sending a next piece of data comprising the ID information to the controlling end, the ID information being randomly generated.

2. The method according to claim 1, wherein the sending the connection request to establish the remote connection to the controlling end comprises:
    sending a remote diagnosis request to the controlling end;
    receiving remote diagnosis response data sent by the controlling end according to the remote diagnosis request; and
    establishing the remote connection to the controlling end according to the remote diagnosis response data.

3. The method according to claim 1, wherein the diagnosis action comprises a selection action of a diagnosis parameter and an execution action of a diagnosis event;
    when the diagnosis action is the selection action of the diagnosis parameter, a corresponding diagnosis parameter or option is selected on the user interface; and
    when the diagnosis action is the execution action of the diagnosis event, a diagnosis instruction corresponding to the execution action of the diagnosis event is sent to the to-be-diagnosed device.

4. The method according to claim 3, further comprising:
    receiving diagnosis result information returned by the to-be-diagnosed device according to the diagnosis instruction; and
    displaying the diagnosis result information on the user interface.

5. The method according to claim 1, wherein the information about the to-be-diagnosed device comprises diagnosis request data; and
    the generating identifiable data according to the information about the to-be-diagnosed device comprises:
    sending a fault code reading instruction to the to-be-diagnosed device according to the diagnosis request data, reading and translating a fault code, and generating the identifiable data.

6. The method according to claim 1, further comprising:
    receiving heartbeat data sent by the controlling end; and
    sending heartbeat response data to the controlling end according to the heartbeat data.

7. A mobile terminal comprising:
    at least one processor; and
    a memory communicatively connected to the at least one processor, wherein
    the memory stores an instruction that may be executed by the at least one processor, the instruction causing the at least one processor to perform the method according to claim 1 when executed by the at least one processor.

8. A remote automobile diagnostic method applied to a controlling end, comprising:
    establishing a remote connection to a controlled end in response to a connection request;

receiving JSON protocol data sent by the controlled end, the JSON protocol data comprising ID information, the ID information being randomly generated;

parsing the JSON protocol data, and generating a synchronization interface associated with a user interface of the controlled end; and receiving an interface operation instruction, generating action data according to the interface operation instruction by a user, and sending the action data to the controlled end, the method further comprising:

sending ID response information to the controlled end when the ID information is received.

9. An electronic device comprising:

at least one processor; and a memory communicatively connected to the at least one processor, wherein the memory stores an instruction that may be executed by the at least one processor, the instruction causing the at least one processor to perform the method according to claim 8 when executed by the at least one processor.

10. A remote automobile diagnostic method, comprising:

respectively establishing connections to a controlled end and a controlling end;

receiving a connection request sent by the controlled end, and forwarding the connection request to the controlling end;

receiving a response connection request sent by the controlling end according to the connection request, and forwarding the response connection request to the controlled end;

receiving JSON protocol data sent by the controlled end, and forwarding the JSON protocol data to the controlling end, the JSON protocol data comprising ID information, the ID information being randomly generated, so that the controlling end parses the JSON protocol data and generate a synchronization interface associated with a user interface of the controlled end; and receiving action data sent by the controlling end, and forwarding the action data to the controlled end;

the method further comprising:

receiving ID response information sent by the controlling end, and forwarding the ID response information to the controlled end, the ID response information being sent when the ID information is received.

11. The method according to claim 10, further comprising:

receiving heartbeat data sent by the controlling end, and forwarding the heartbeat data to the controlled end; and receiving heartbeat response data sent by the controlled end according to the heartbeat data, and forwarding the heartbeat response data to the controlling end.

12. A server comprising:

at least one processor; and a memory communicatively connected to the at least one processor, wherein the memory stores an instruction that may be executed by the at least one processor, the instruction causing the at least one processor to perform the method according to claim 10 when executed by the at least one processor.

* * * * *